US008950701B2

(12) United States Patent
Sparks et al.

(10) Patent No.: US 8,950,701 B2
(45) Date of Patent: Feb. 10, 2015

(54) ENGINE COWL AND INLET COVER

(71) Applicant: The Boeing Company, Chicago, IL (US)

(72) Inventors: Rick Earl Sparks, Stanwood, WA (US); Shelby T. Dobbs, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/279,527

(22) Filed: May 16, 2014

(65) Prior Publication Data
US 2014/0245665 A1 Sep. 4, 2014

Related U.S. Application Data

(63) Continuation-in-part of application No. 14/165,015, filed on Jan. 27, 2014, now abandoned, which is a continuation of application No. 13/368,802, filed on Feb. 8, 2012, now Pat. No. 8,651,415.

(51) Int. Cl.
*B64D 33/02* (2006.01)
*B64D 25/00* (2006.01)
*B64F 1/00* (2006.01)

(52) U.S. Cl.
CPC .................................. *B64F 1/005* (2013.01)
USPC ....................................... 244/53 B; 244/121

(58) Field of Classification Search
CPC ....... B64D 33/02; B64D 25/00; B64C 1/1476
USPC ................ 244/53 B, 121; 55/306; 60/39.091, 60/39.092; 181/214, 217, 218, 22
See application file for complete search history.

(56) References Cited

U.S. PATENT DOCUMENTS 2,744,382 A    5/1956  Sokol et al.
(Continued)

OTHER PUBLICATIONS

"More Random Aviation Photos," Aviation Spectator, 18 pages, accessed Jan. 17, 2012, www.aviationspectator.com/more-aviation-photos?page=9.
(Continued)

*Primary Examiner* — Philip J Bonzell
(74) *Attorney, Agent, or Firm* — Yee & Associates, P.C.

(57) ABSTRACT

A method for covering an end of a housing for an engine. A cover is positioned relative to the end of the housing for the engine. The cover comprises a structure, a flange comprised of a deformable material extending from the structure around a circumference of the structure, and a retaining feature configured to extend from a middle portion of the structure such that the retaining feature and the flange form a channel configured to receive the end of the housing. The cover is moved in a direction towards the end of the housing for the engine such that the retaining feature extends into an inlet of the engine through an opening of the housing to form an interference fit between the retaining feature and a portion of an interior surface of the housing.

18 Claims, 18 Drawing Sheets

(56) References Cited

U.S. PATENT DOCUMENTS

| | | | |
|---|---|---|---|
| 2,962,184 | A | 11/1960 | Meier |
| 3,000,533 | A | 9/1961 | Jodock |
| 3,194,525 | A | 7/1965 | Webb |
| 3,646,980 | A | 3/1972 | Peterson |
| D232,626 | S | 9/1974 | Smallwood |
| 4,760,978 | A | 8/1988 | Schuyler et al. |
| D303,784 | S | 10/1989 | Micallef |
| 4,874,145 | A | 10/1989 | Prentice |
| 5,114,098 | A | 5/1992 | Campbell |
| 5,660,357 | A | 8/1997 | Grossman et al. |
| 6,871,819 | B2 | 3/2005 | Garric |
| 7,625,415 | B2 | 12/2009 | Durocher et al. |
| 8,651,415 | B1 | 2/2014 | Sparks |

OTHER PUBLICATIONS

"How Can Airplanes Avoid a Bird Strike," Tech Ops Forum, Airliners.net, 9 pages, accessed Jan. 17, 2012, http://www.airliners.net/aviation-forums/tech_ops/read.main/247222/.

Hanssen et al., "A numerical model for bird strike of aluminium foam-based sandwich panels," International Journal of Impact Engineering, vol. 32, Iss. 7, Jul. 2006, pp. 1127-1124.

Office Action, dated Aug. 9, 2013, regarding U.S. Appl. No. 13/368,802, 14 pages.

Notice of Allowance, dated Oct. 22, 2013, regarding U.S. Appl. No. 13/368,802, 9 pages.

Sparks, "Engine Cowl and Inlet Cover," U.S. Appl. No. 14/165,015, filed Jan. 27, 2014, 46 pages.

Office Action, dated Feb. 27, 2014, regarding U.S. Appl. No. 14/165,015, 15 pages.

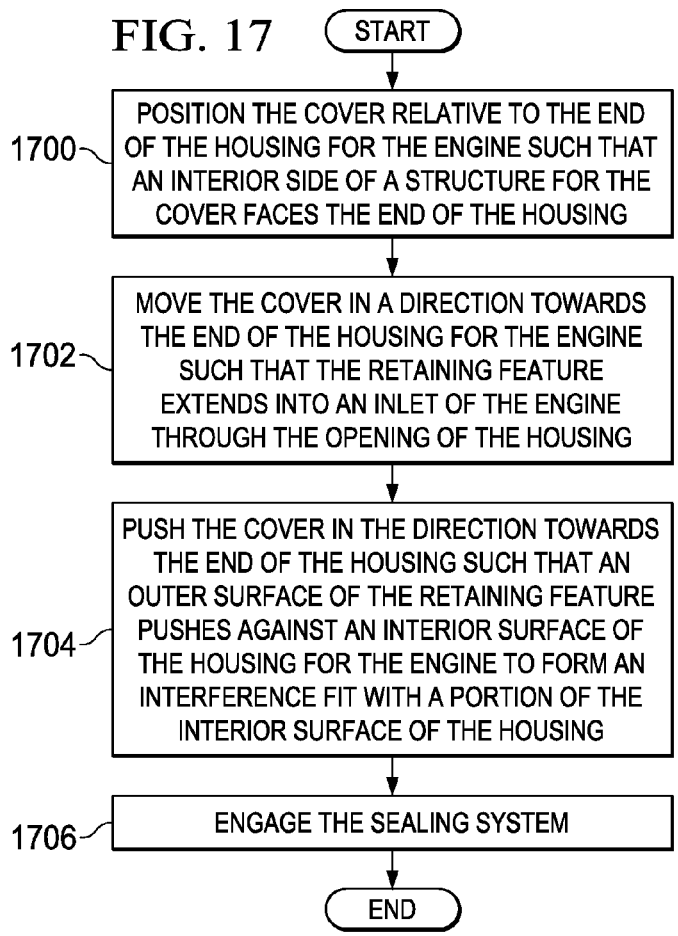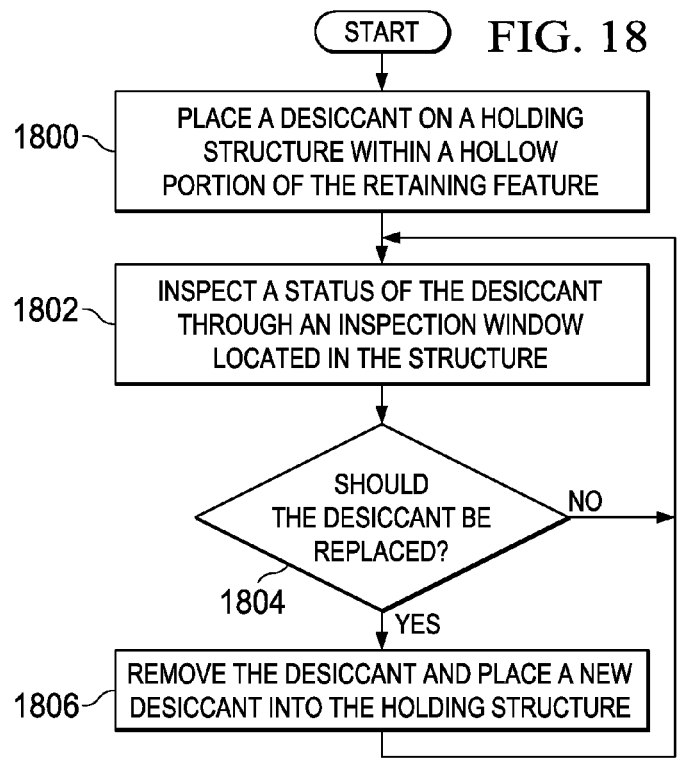

ENGINE COWL AND INLET COVER

CROSS-REFERENCE TO RELATED APPLICATIONS

This application is a continuation-in-part of prior U.S. patent application Ser. No. 14/165,015, filed Jan. 27, 2014, which is a continuation application of prior U.S. patent application Ser. No. 13/368,802, filed Feb. 8, 2012, issued as U.S. Pat. No. 8,651,415 on Feb. 18, 2014, both of which are incorporated herein by reference.

BACKGROUND INFORMATION

1. Field

The present disclosure relates generally to aircraft engines and, in particular, to a method and apparatus for protecting the leading edge of a cowl structure and inlet for an aircraft engine.

2. Background

Some currently available aircraft have two or more jet engines mounted to the wings of the aircraft. Turbofans and turbojets are two different types of jet engines that are currently available. Each of these different types of jet engines comprises a housing with an opening at a forward end of the housing. The forward end of the housing is the end of the housing configured to be closest to the nose of the aircraft. The opening at the forward end of the housing allows air to be drawn into the jet engine through an inlet formed by the interior surface of the housing at the forward end of the housing.

Covering this opening into the inlet of a jet engine on an aircraft may be desirable when the aircraft is not in service. For example, covering this opening may be desirable when the aircraft is being stored in a facility, when maintenance is being performed on other parts of the aircraft, when the aircraft is being inspected, during finishing operations, during painting operations, and/or when other operations are being performed on the aircraft.

Further, covering the opening into the inlet of the jet engine may prevent particles, dust, debris, foliage, foreign objects, sand, and/or other undesired items from entering the inlet of the jet engine. The opening of the jet engine may also be covered to protect the inlet from rain, moisture, snow, and/or other weather conditions.

Wind milling may also be prevented by covering the opening into the inlet of the jet engine. Wind milling is the unintended turning of the fan and/or turbine in a jet engine in an aircraft in response to prevailing winds around the aircraft. When an aircraft is stored for long periods of time without a cover for the opening into the inlet of the jet engine, wind milling may cause undesired wear of the jet engine.

Some currently available solutions for covering the opening into the inlet of a jet engine may be covers that comprise plastic materials, fiberglass, and/or other hard materials. These covers may cover the opening into the inlet but may cause undesired inconsistencies to form at the leading edge of the housing. Further, these covers may be unable to protect the leading edge of the housing from inconsistencies caused by, for example, maintenance equipment coming into contact with the leading edge of the housing. Therefore, it would be desirable to have a method and apparatus that take into account at least some of the issues discussed above as well as possible other issues.

SUMMARY

In one illustrative embodiment, an apparatus comprises a structure, a flange, a retaining feature, and a sealing system. The structure is configured to cover an opening of a housing for an engine. The flange is comprised of a deformable material and extends from the structure around a circumference of the structure. The retaining feature is configured to extend as a hollow cylinder into an inlet of the engine through the opening of the housing from a middle portion of the structure, the hollow cylinder being sealed at one end by the structure, such that the retaining feature and the flange form a channel configured to receive an end of the housing and form an interference fit with a portion of an interior surface of the housing. The sealing system is configured to reduce moisture entering the opening of the housing into the inlet of the engine.

In yet another illustrative embodiment, a method for covering an end of a housing for an engine is provided. A cover is positioned relative to the end of the housing for the engine. The cover comprises a structure, a flange comprised of a deformable material extending from the structure around a circumference of the structure, and a retaining feature configured to extend from a middle portion of the structure such that the retaining feature and the flange form a channel configured to receive the end of the housing. The cover is moved in a direction towards the end of the housing for the engine such that the retaining feature extends into an inlet of the engine through an opening of the housing to form an interference fit between the retaining feature and a portion of an interior surface of the housing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 17 is an illustration of a process for covering an end of a housing for an engine in the form of a flowchart in accordance with an illustrative embodiment;

FIG. 18 is an illustration of a process for producing moisture in the form of a flowchart in accordance with an illustrative embodiment;

DETAILED DESCRIPTION

The different illustrative embodiments recognize and take into account different considerations. For example, the different illustrative embodiments recognize and take into account that impact at the forward end of the housing for a jet engine may cause any number of inconsistencies to be formed on the housing. Items, such as, for example, without limitation, maintenance equipment, carts, ladders, rails, racks, and/or other items may impact the forward end of the housing when the jet engine is in storage and/or under maintenance.

One or more of these items impacting the forward end of the housing may cause inconsistencies to be formed at the leading edge of the housing and/or the exterior surface of a cowl structure at the forward end of the housing. These inconsistencies may increase maintenance and/or service costs for the jet engine and/or an aircraft on which the jet engine is mounted more than desired. Consequently, the different illustrative embodiments recognize and take into account that covering the leading edge of the housing for a jet engine on an aircraft in addition to covering the opening into the inlet for the jet engine may be desirable.

The different illustrative embodiments recognize and take into account that some currently available covers for this opening may be unable to cover and/or protect the leading edge of the housing. Further, the different illustrative embodiments also recognize and take into account that some of the currently available covers may be comprised of materials that are hard and may scratch the leading edge of the housing and/or exterior surface of the cowl structure.

Thus, the different illustrative embodiments provide a method and apparatus for protecting an inlet of an aircraft engine and a leading edge of a cowl structure for the aircraft engine. In one illustrative embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

Figure 1:
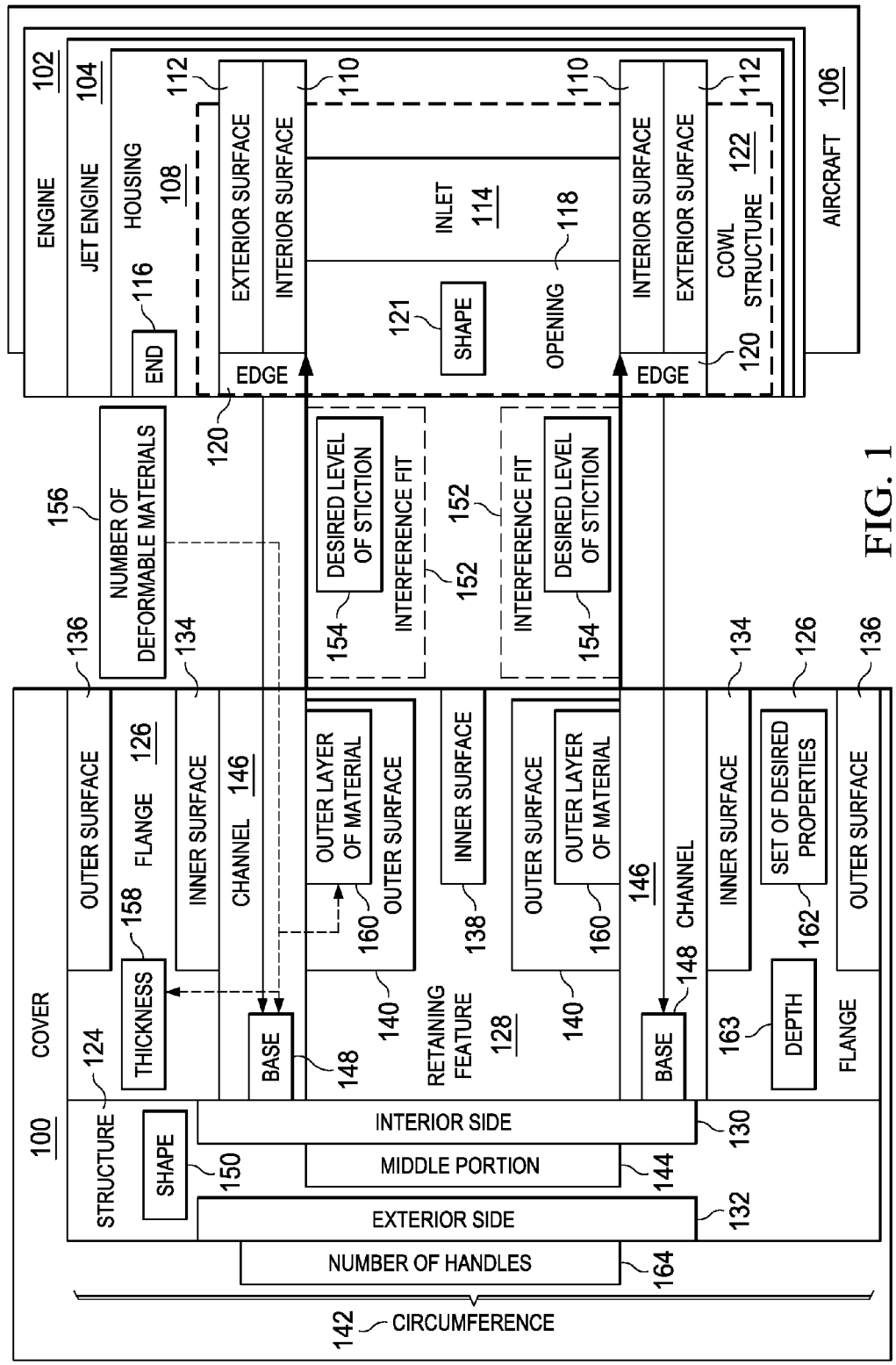
FIG. 1 is an illustration of a cover in the form of a block diagram in accordance with an illustrative embodiment.

With reference now to the figures and, in particular, with reference to FIG. 1, an illustration of a cover in the form of a block diagram is depicted in accordance with an illustrative embodiment. In these illustrative examples, cover 100 may be used as a cover for engine 102.

Engine 102 may take the form of jet engine 104 in these illustrative examples. Jet engine 104 may be, for example, without limitation, a turbofan, a turbojet, a turbine engine, or some other suitable type of engine.

As depicted, jet engine 104 may be mounted to aircraft 106. Aircraft 106 may take the form of, for example, without limitation, an airplane, a jet, an unmanned aerial vehicle, or some other suitable type of aircraft. Of course, in other illustrative examples, jet engine 104 may be for a missile, an automobile, or some other suitable type of vehicle.

As depicted, engine 102 has housing 108. Housing 108 has interior surface 110 and exterior surface 112. A portion of interior surface 110 of housing 108 forms inlet 114 at end 116 of housing 108. End 116 is a forward end of housing 108 in these illustrative examples. In other words, when engine 102 is for aircraft 106, end 116 of housing 108 for engine 102 may be the end closer to the nose of aircraft 106.

Inlet 114 is the space within the hollow portion of housing 108 formed by interior surface 110 through which air may enter into housing 108. In particular, air may enter inlet 114 through opening 118 at end 116 of housing 108. In some cases, inlet 114 may also be referred to as an "air intake".

In these illustrative examples, opening 118 may be defined by edge 120 of housing 108 at end 116. Edge 120 may be referred to as the "leading edge" of housing 108. In particular, edge 120 may be the leading edge for cowl structure 122 of housing 108. Cowl structure 122 may be a particular section of housing 108 located at end 116 of housing 108. Cowl structure 122 may also be referred to as a "cowl" for engine 102.

As depicted, opening 118 may have shape 121. Shape 121 may be any shape formed by a closed curve. In some illustrative examples, shape 121 may be a substantially circular shape. However, in other illustrative examples, the closed curve that forms shape 121 may have one or more portions that are circular, substantially linear, and/or curved in some other manner.

In these illustrative examples, cover 100 may be attached to end 116 of housing 108 to cover opening 118 at end 116 and protect edge 120 of cowl structure 122. As depicted, cover 100 comprises structure 124, flange 126, and retaining feature 128.

Structure 124 has interior side 130 and exterior side 132. Interior side 130 is the side of structure 124 that faces end 116 of housing 108 when cover 100 is attached to end 116 of housing 108. Exterior side 132 is opposite to interior side 130. In these illustrative examples, exterior side 132 of structure 124 is substantially planar. In other words, exterior side 132 is substantially flat.

As depicted, flange 126 has inner surface 134 and outer surface 136. Further, retaining feature 128 has inner surface 138 and outer surface 140. Both flange 126 and retaining feature 128 extend from structure 124 at interior side 130 of structure 124.

In particular, flange 126 extends from structure 124 around circumference 142 of structure 124. Circumference 142 is the outer perimeter of structure 124. In these illustrative examples, flange 126 may extend from structure 124 at an angle perpendicular to interior side 130 of structure 124. However, in other illustrative examples, flange 126 may extend from structure 124 at some other angle with respect to interior side 130 of structure 124. Further, retaining feature 128 extends from middle portion 144 of structure 124.

In these illustrative examples, flange 126 and retaining feature 128 extend from structure 124 in a manner that forms channel 146. Channel 146 is formed by inner surface 134 of flange 126 and outer surface 140 of retaining feature 128. Base 148 of channel 146 is located between inner surface 134 of flange 126 and outer surface 140 of retaining feature 128. Channel 146 is configured to receive edge 120 of cowl structure 122 when cover 100 is attached to end 116 of housing 108.

Attaching cover 100 to end 116 of housing 108 for engine 102 includes positioning cover 100 relative to end 116. In particular, cover 100 may be positioned relative to end 116 such that interior side 130 of structure 124 with flange 126 and retaining feature 128 face end 116.

Structure 124 has shape 150 selected to fully cover opening 118 of housing 108 when cover 100 is positioned relative to end 116. In one illustrative example, shape 150 may be similar to shape 121 of opening 118 of housing 108. In other words, shape 150 of structure 124 may have dimensions substantially equal to the dimensions for shape 121 of opening 118. In other illustrative examples, shape 150 may be larger than shape 121 of opening 118 to ensure that opening 118 is fully covered.

Attaching cover 100 to end 116 of housing 108 further includes moving cover 100 in a direction towards inlet 114 of housing 108 such that retaining feature 128 extends through opening 118 of housing 108 and into inlet 114. Cover 100 may be moved such that retaining feature 128 extends into inlet 114 to form interference fit 152 with a portion of interior surface 110 of housing 108. In particular, interference fit 152 is formed between a portion of interior surface 110 of housing 108 and a portion of outer surface 140 of retaining feature 128.

As used herein, an "interference fit" between two components, such as interference fit 152 between interior surface 110 of housing 108 and outer surface 140 of retaining feature 128, is a fastening of these two components through friction when these components are pushed together.

For example, when retaining feature 128 is moved into inlet 114, outer surface 140 of retaining feature 128 is pushed against interior surface 110 of housing 108. This contact between outer surface 140 of retaining feature 128 and interior surface 110 of housing 108 creates friction. The friction created increases as retaining feature 128 is moved further into inlet 114 until interference fit 152 is formed.

In these illustrative examples, interference fit 152 provides desired level of stiction 154 between interior surface 110 of housing 108 and outer surface 140 of retaining feature 128. "Stiction," as used herein, may be the static friction that needs to be overcome to enable relative motion of stationary objects in contact.

In this manner, desired level of stiction 154 may be a desired level of static friction that needs to be overcome to enable relative motion between cover 100 and end 116 of housing 108. Cover 100 may be considered to be attached to end 116 of housing 108 when interference fit 152 has been formed with desired level of stiction 154.

In these illustrative examples, channel 146 is configured to receive edge 120 of cowl structure 122 when retaining feature 128 is moved into inlet 114. In some cases, edge 120 may come into contact with base 148 of channel 146 when retaining feature 128 is moved into inlet 114 and/or interference fit 152 is formed.

Further, in some illustrative examples, a portion of exterior surface 112 of housing 108 at end 116 may come into contact with inner surface 134 of flange 126 when retaining feature 128 is moved into inlet 114 and/or interference fit 152 is formed. Of course, in other illustrative examples, edge 120 and/or exterior surface 112 of housing 108 may not come into contact with base 148 of channel 146 and/or inner surface 134 of flange 126 when interference fit 152 is being formed. In particular, contact between interior surface 110 of housing 108 and outer surface 140 of retaining feature 128 may be the only contact formed between engine 102 and cover 100 in some illustrative examples.

Flange 126, retaining feature 128, and base 148 of channel 146 may be comprised of any number of materials. These materials may be selected to reduce a possibility of a number of inconsistencies being formed at edge 120 of cowl structure 122, on exterior surface 112 of cowl structure 122, and/or on interior surface 110 of cowl structure 122 when retaining feature 128 is moved into inlet 114 and interference fit 152 is being formed. As used herein, a "number of," when used with reference to items, means one or more items. For example, a number of inconsistencies means one or more inconsistencies.

Further, flange 126 may be comprised of a deformable material selected from at least one of number of deformable materials 156. A deformable material in number of deformable materials 156 may be any material configured to be flexible and/or capable of being shaped. Further, a deformable material in number of deformable materials 156 may be a material that does not cause inconsistencies outside of selected tolerances to form on a surface when the surface is in contact with the material.

Number of deformable materials 156 may include at least one of, for example, without limitation, a foam material, a polyurethane material, an elastomer, a polymer, a shape memory polymer, a syntactic foam material, an integral skin foam material, an aerogel, or some other suitable types of deformable material. In one illustrative example, flange 126 may be comprised of a foam material selected from number of deformable materials 156.

Depending on the implementation, this foam material may comprise at least one of an open-cell foam material, a closed-cell foam material, a shape memory polymer, a composite material, or some other suitable type of material. Of course, in other illustrative examples, flange 126 may be comprised of one or more other deformable materials selected from number of deformable materials 156 in addition to and/or in place of a foam material.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Further, one or more deformable materials selected from number of deformable materials 156 may be added to base 148 of channel 146. In this manner, a possibility of inconsistencies being formed at edge 120 of cowl structure 122 when edge 120 comes into contact with base 148 may be reduced.

In these illustrative examples, retaining feature 128 may be comprised of various materials. Retaining feature 128 may be comprised of any number of materials configured to give retaining feature 128 a selected level of rigidity. In this manner, retaining feature 128 may not change shape or bend outside of selected tolerances when retaining feature 128 is moved into inlet 114 to form interference fit 152.

Retaining feature 128 may be comprised of, for example, without limitation, at least one of a rubber material, a silicone material, an elastomer, a foam material, a rubberized foam material, a honeycomb material, or other suitable types of materials. Additionally, in some illustrative examples, at least a portion of outer surface 140 of retaining feature 128 may be formed by outer layer of material 160. Outer layer of material 160 may form at least the portion of outer surface 140 of retaining feature 128 that forms interference fit 152 with interior surface 110 of housing 108.

Outer layer of material 160 may be selected to reduce a possibility of inconsistencies being formed on interior surface 110 of housing 108 when retaining feature 128 is moved into inlet 114 to form interference fit 152. In one illustrative example, outer layer of material 160 may comprise one or more deformable materials selected from number of deformable materials 156. Outer layer of material 160 of retaining feature 128 may have a smaller thickness than thickness 158 of flange 126 in some cases.

In these illustrative examples, the one or more deformable materials selected from number of deformable materials 156 for flange 126 and thickness 158 for flange 126 may be selected such that flange 126 has set of desired properties 162. Set of desired properties 162 may include at least one of a desired level of thermal resistance, a desired flexibility, a desired weight, a capability of absorbing kinetic energy, a capability of being easily cleaned, and other suitable properties.

As one illustrative example, thickness 158 for flange 126 may be selected to reduce a possibility of one or more inconsistencies being formed on exterior surface 112 of housing 108 when kinetic energy is applied to flange 126. Kinetic energy may be applied to flange 126 when, for example, an object impacts flange 126. Thickness 158 may be selected such that at least a portion of the kinetic energy applied to flange 126 is absorbed. Further, the deformable material selected for flange 126 may be configured to absorb the kinetic energy applied to flange 126.

Additionally, depth 163 for flange 126 may be selected such that flange 126 extends over a portion of exterior surface 112 of housing 108 by a desired amount when cover 100 is attached to end 116 of housing 108. Flange 126 may cover and protect this portion of exterior surface 112 from, for example, without limitation, impact by a foreign object.

In these depicted examples, structure 124 may be comprised of any number of materials configured to give structure 124 a selected level of rigidity and strength. For example, without limitation, structure 124 may be comprised of at least one of wood, plastic, metal, a metal alloy, a composite material, fiberglass, a resin-filled fiber, a honeycomb sandwich panel, a metal honeycomb and resin-reinforced fiber panel, or other suitable types of materials.

In these illustrative examples, cover 100 may have number of handles 164 attached to exterior side 132 of structure 124. Number of handles 164 may be used to attach cover 100 to end 116 of housing 108, remove cover 100 from end 116 of housing 108, transport cover 100, store cover 100, position cover 100, and/or handle cover 100 in some other suitable manner.

Thus, the different illustrative embodiments provide a cover for an inlet of an engine that also protects a leading edge of the housing for the engine. Cover 100 may be used to cover opening 118 into inlet 114 and protect edge 120 of cowl structure 122 in a number of different situations.

These situations may include, for example, without limitation, when engine 102 is in storage, when operations are being performed on engine 102, when engine 102 is being visually inspected, when painting operations are being performed on engine 102, and/or other suitable situations. Further, cover 100 may be attached to end 116 of housing 108 when engine 102 is mounted on aircraft 106 and/or when engine 102 is not mounted on aircraft 106. When engine 102 is mounted on aircraft 106, cover 100 may be used when aircraft 106 is being manufactured, is not in use, is in storage, or is under maintenance.

The illustration of cover 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, cover 100 may include features in addition to structure 124, flange 126, and retaining feature 128. In some illustrative examples, retaining feature 128, flange 126, and/or structure 124 may be coated with a material in addition to the materials for these features described above. The coating may be, for example, without limitation, a silicone coating, a protective coating, a liquid repellant coating, or some other suitable type of coating.

In other illustrative examples, additional layers of material may be placed on cover 100 when using cover 100 during certain operations. For example, without limitation, when cover 100 is used to protect inlet 114 and edge 120 of cowl structure 122 during painting operations, a layer of material may be placed around outer surface 136 of flange 126. Masking tape used during painting operations may be attached to this layer of material instead of outer surface 136 of flange 126 to protect inconsistencies from forming on outer surface 136 of flange 126 as a result of the masking tape.

Referring now to FIGS. 2-9, illustrations of an example of one implementation for a cover for an inlet of an engine are depicted in accordance with an illustrative embodiment. In FIGS. 2-9, cover 200 is an example of one implementation for cover 100 in FIG. 1.

Figure 2:
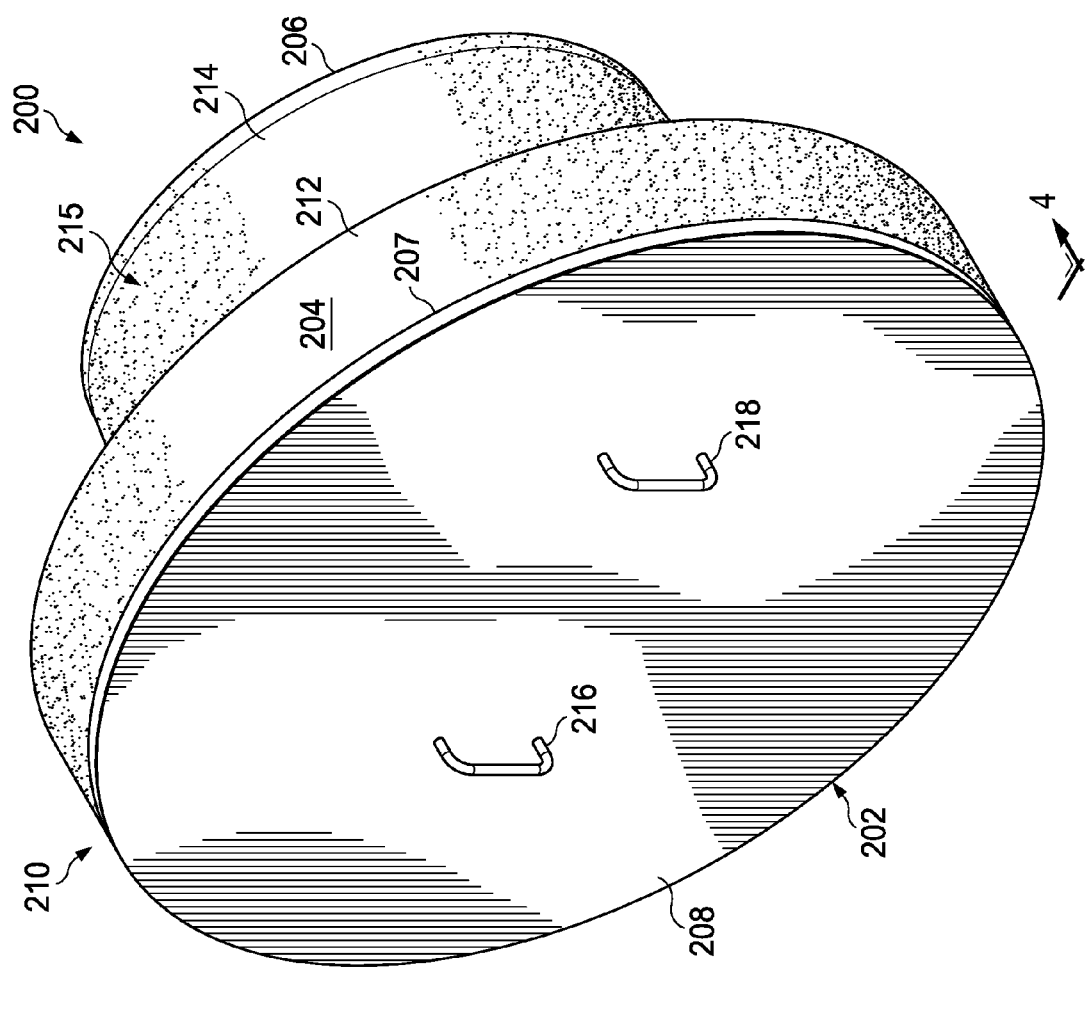
FIG. 2 is an illustration of a perspective view of a cover in accordance with an illustrative embodiment.

With reference now to FIG. 2, an illustration of a perspective view of cover 200 is depicted in accordance with an illustrative embodiment. In this illustrative example, cover 200 comprises structure 202, flange 204, and retaining feature 206. Structure 202, flange 204, and retaining feature 206 are examples of implementations for structure 124, flange 126, and retaining feature 128, respectively, in FIG. 1.

Structure 202 has interior side 207 and exterior side 208. Exterior side 208 of structure 202 is substantially planar in this illustrative example. In other words, exterior side 208 is substantially flat.

In this depicted example, flange 204 extends from structure 202 at interior side 207 of structure 202. In particular, flange 204 extends from structure 202 around circumference 210 of structure 202. Flange 204 has an inner surface (not seen in this view) and outer surface 212. Further, retaining feature 206 extends from a middle portion of structure 202 at interior side 207 of structure 202. Retaining feature 206 has an inner surface (not seen in this view) and outer surface 214. Outer layer of material 215 is present at outer surface 214.

Additionally, as depicted, cover 200 has handle 216 and handle 218. Handle 216 and handle 218 may be used to position cover 200, transport cover 200, move cover 200, attach cover 200 to the end of a housing for an engine, store cover 200, and/or handle cover 200 in some other suitable manner.

Figure 3:
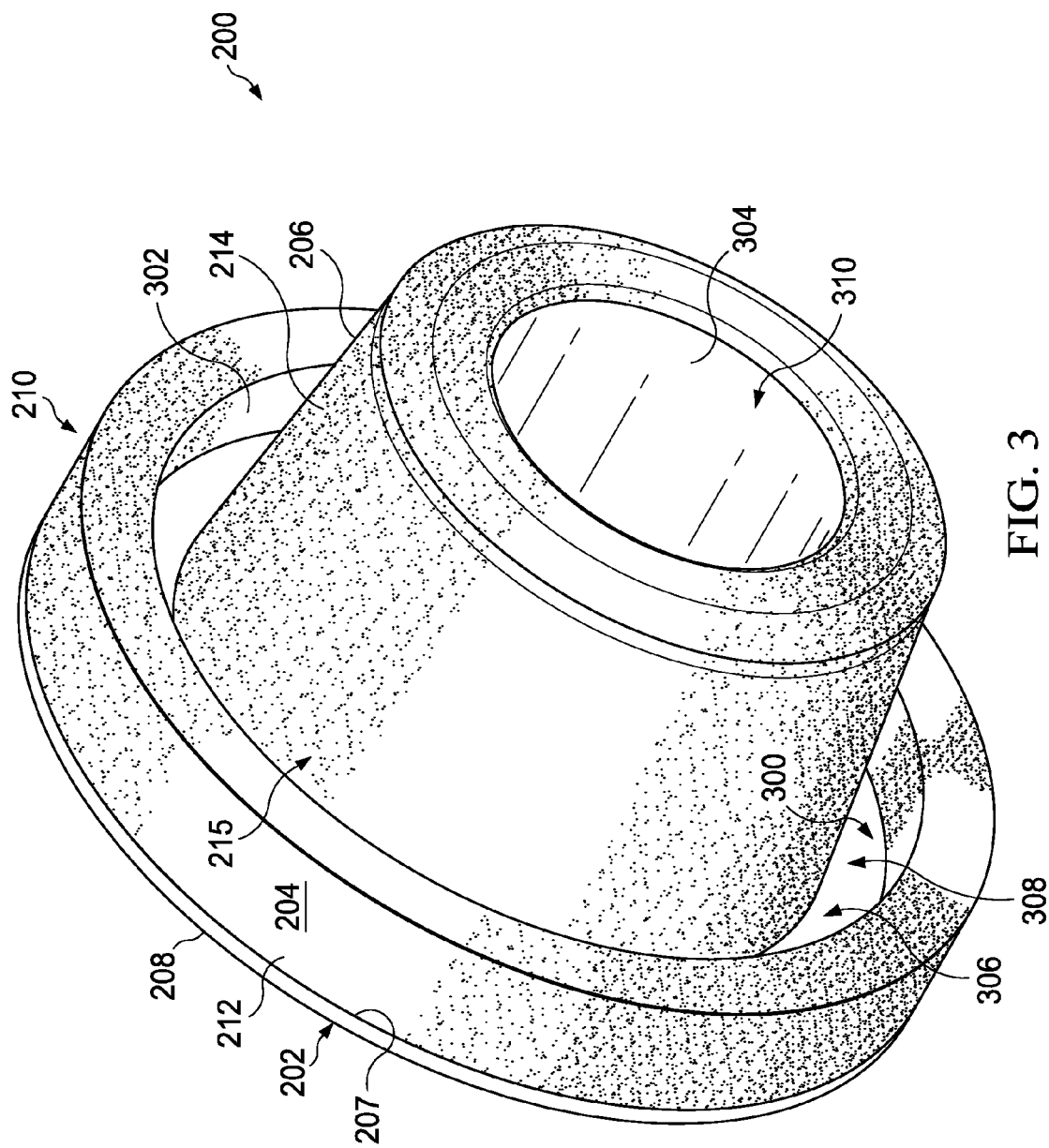
FIG. 3 is an illustration of another perspective view of a cover in accordance with an illustrative embodiment.

With reference now to FIG. 3, an illustration of another perspective view of cover 200 is depicted in accordance with an illustrative embodiment. In this illustrative example, flange 204 and retaining feature 206 are seen extending from interior side 207 of structure 202. Further, inner surface 302 of flange 204 and inner surface 304 of retaining feature 206 are seen.

In this illustrative example, flange 204 and retaining feature 206 extend from structure 202 at interior side 207 of structure 202 in a manner that forms channel 306. Channel 306 may have base 308 located at interior side 207 of structure 202. Channel 306 may be configured to receive a leading edge of a cowl structure for a housing for an engine.

As depicted, inner surface 304 of retaining feature 206 forms hollow portion 310 in retaining feature 206. Hollow portion 310 may be configured to reduce the amount of material needed for retaining feature 206. In this manner, hollow portion 310 may reduce a weight and/or cost for retaining feature 206 as compared to hollow portion 310 being filled.

In this illustrative example, flange 204, retaining feature 206, and base 308 of channel 306 may comprise materials configured to reduce a possibility of inconsistencies being formed at the forward end of the housing for an engine when cover 200 is attached to the forward end of the housing. For example, flange 204 may be comprised of a deformable material, such as, for example, a memory foam material. Further, the memory foam material may also be added to base 308 of channel 306.

As depicted, retaining feature 206 may have outer layer of material 215 at outer surface 214 of retaining feature 206. Outer layer of material 215 may also be comprised of a memory foam material in this depicted example. Other portions of retaining feature 206 may be comprised of a material selected to give retaining feature 206 a selected level of rigidity.

Figure 4:
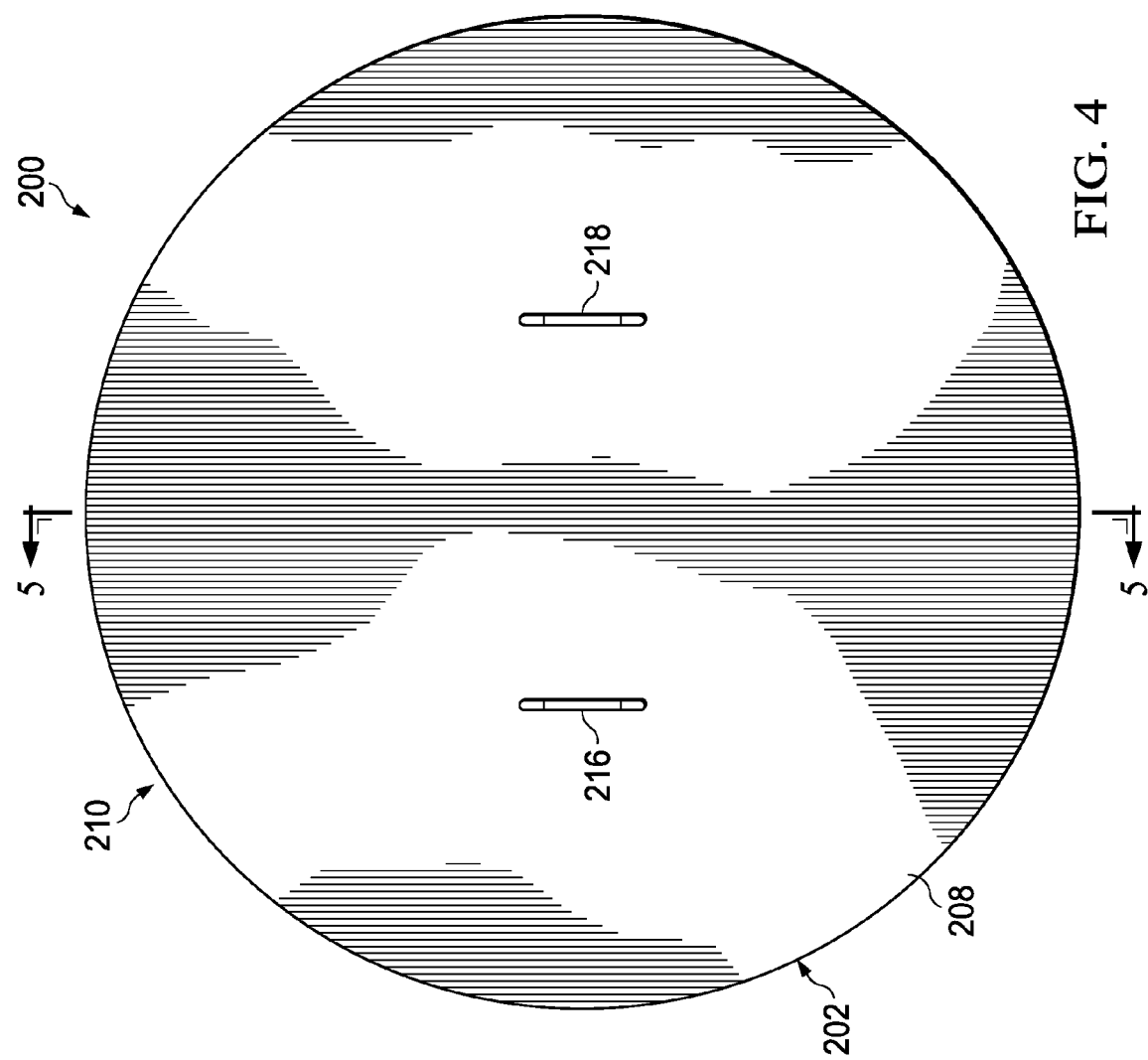
FIG. 4 is an illustration of a top view of a cover in accordance with an illustrative embodiment.

With reference now to FIG. 4, an illustration of a top view of cover 200 is depicted in accordance with an illustrative embodiment. In this illustrative example, a top view of cover 200 taken along lines 4-4 in FIG. 2 is depicted.

Figure 5:
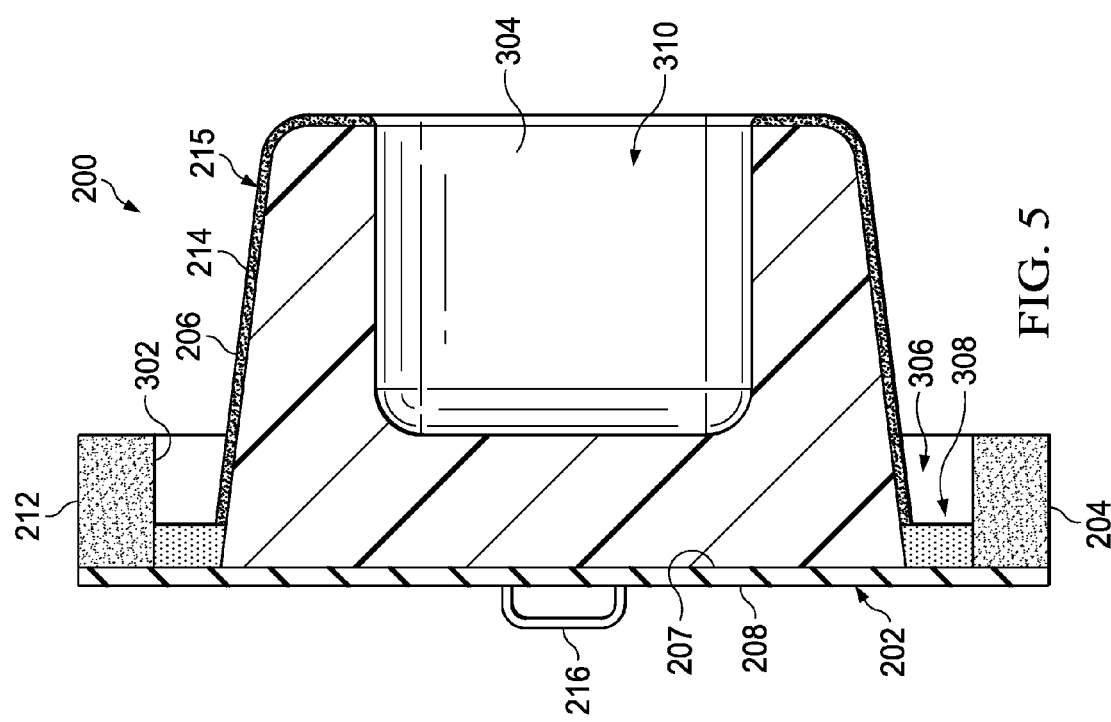
FIG. 5 is an illustration of a cross-sectional view of a cover in accordance with an illustrative embodiment.

Turning now to FIG. 5, an illustration of a cross-sectional view of cover 200 is depicted in accordance with an illustrative embodiment. In this illustrative example, a cross-sectional view of cover 200 taken along lines 5-5 in FIG. 4 is depicted. This cross-sectional view provides a clearer view of channel 306.

Figure 6:
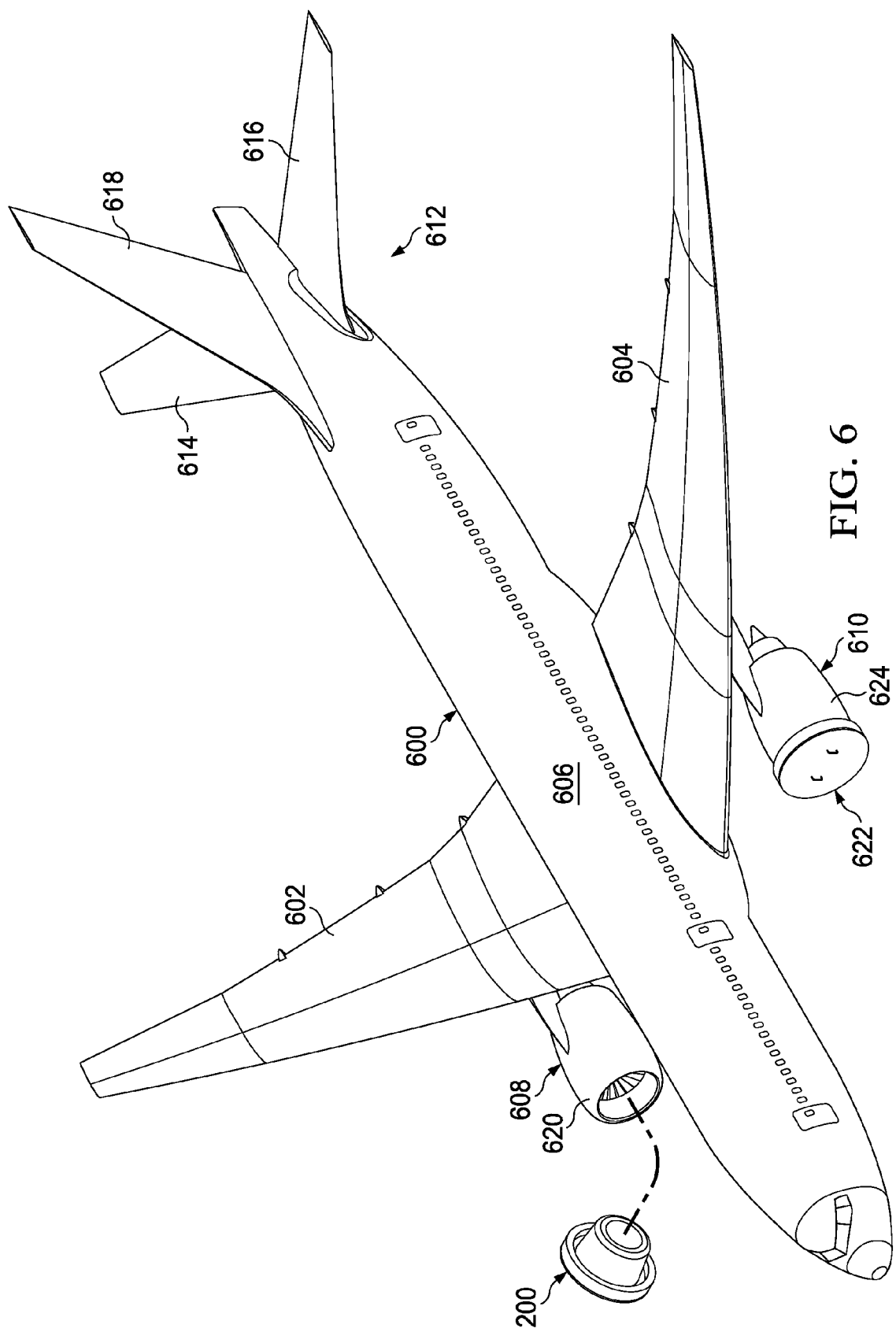
FIG. 6 is an illustration of an aircraft with a cover attached to an engine of the aircraft in accordance with an illustrative embodiment.

With reference now to FIG. 6, an illustration of an aircraft with cover 200 attached to an engine of the aircraft is depicted in accordance with an illustrative embodiment. In this illustrative example, aircraft 600 is an example of one implementation for aircraft 106 in FIG. 1. Aircraft 600 has wing 602 and wing 604 attached to body 606.

Aircraft 600 includes engine 608 attached to wing 602 and engine 610 attached to wing 604. Engine 608 and engine 610 may be examples of one implementation for engine 102 in FIG. 1. Body 606 of aircraft 600 has tail section 612. Horizontal stabilizer 614, horizontal stabilizer 616, and vertical stabilizer 618 are attached to tail section 612 of body 606.

As depicted, cover 200 from FIGS. 2-5 may be positioned relative to housing 620 for engine 608 for attachment to housing 620. In this illustrative example, cover 622 has already been attached to housing 624 for engine 610. Cover 622 may be implemented in a manner similar to cover 200 in FIGS. 2-5.

Figure 7:
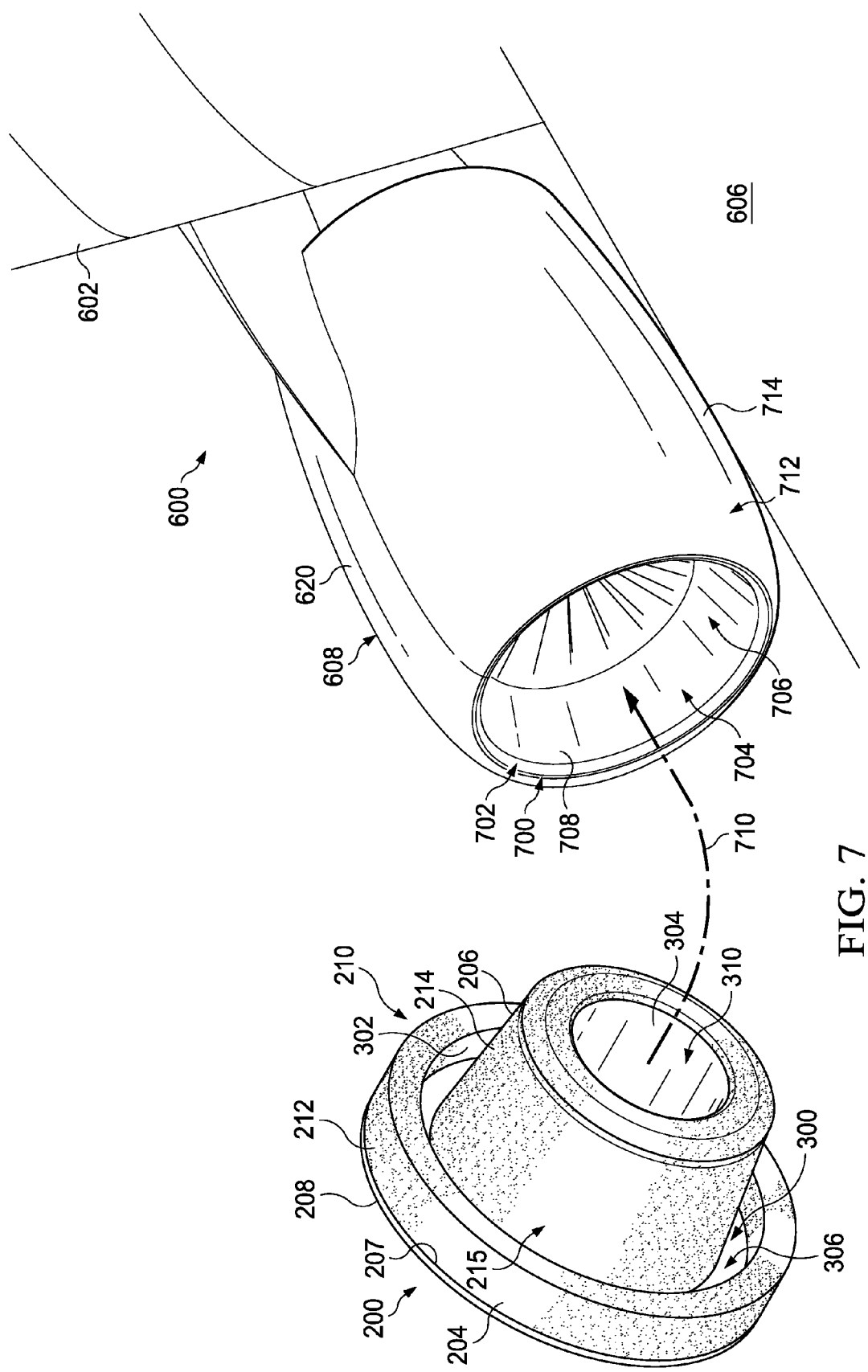
FIG. 7 is an illustration of a cover positioned near an engine in accordance with an illustrative embodiment.

With reference now to FIG. 7, an illustration of cover 200 positioned near engine 608 is depicted in accordance with an illustrative embodiment. As depicted, cover 200 may be configured for attachment to end 700 of housing 620 of engine 608.

Housing 620 has leading edge 702 at end 700 of housing 620. Leading edge 702 defines opening 704. Opening 704 may be an opening into inlet 706 for engine 608. Inlet 706 may be formed by interior surface 708 of housing 620.

In this illustrative example, cover 200 may be moved towards housing 620 in the direction of arrow 710 to attach cover 200 to end 700 of housing 620. When cover 200 is moved towards inlet 706, retaining feature 206 of cover 200 moves through opening 704 and extends into inlet 706. Outer surface 214 of retaining feature 206 may form an interference fit with interior surface 708 of housing 620.

Further, as retaining feature 206 is moved into inlet 706, channel 306 may receive leading edge 702 of housing 620. In this illustrative example, leading edge 702 is the leading edge of cowl structure 712 of housing 620.

When retaining feature 206 has been pushed into inlet 706 far enough in the direction of arrow 710 such that an interference fit is formed, flange 204 may extend over a portion of exterior surface 714 of housing 620 at end 700 of housing 620 to cover this portion of exterior surface 714. In this manner, cover 200 may be attached to end 700 of housing 620 for engine 608 to cover opening 704 into inlet 706 and protect leading edge 702 of cowl structure 712 of housing 620.

Figure 8:
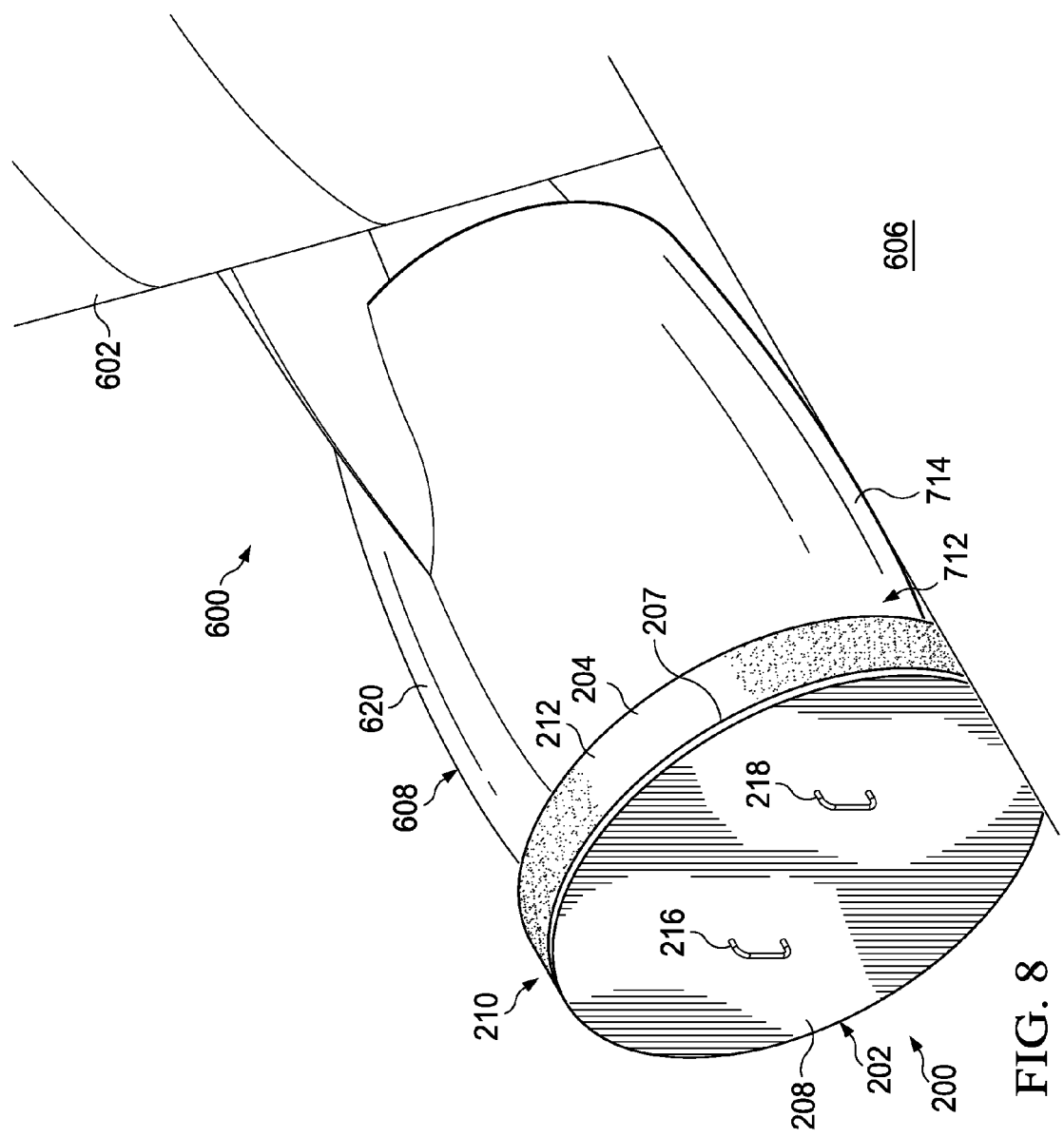
FIG. 8 is an illustration of a cover attached to an engine in accordance with an illustrative embodiment.

Turning now to FIG. 8, an illustration of cover 200 attached to engine 608 is depicted in accordance with an illustrative embodiment. In this illustrative example, cover 200 has been attached to end 700 in FIG. 7 of housing 620. As depicted, opening 704 into inlet 706 of engine 608 in FIG. 7 has been covered by cover 200. Further, leading edge 702 of cowl structure 712 of housing 620 in FIG. 7 has been covered.

Figure 9:
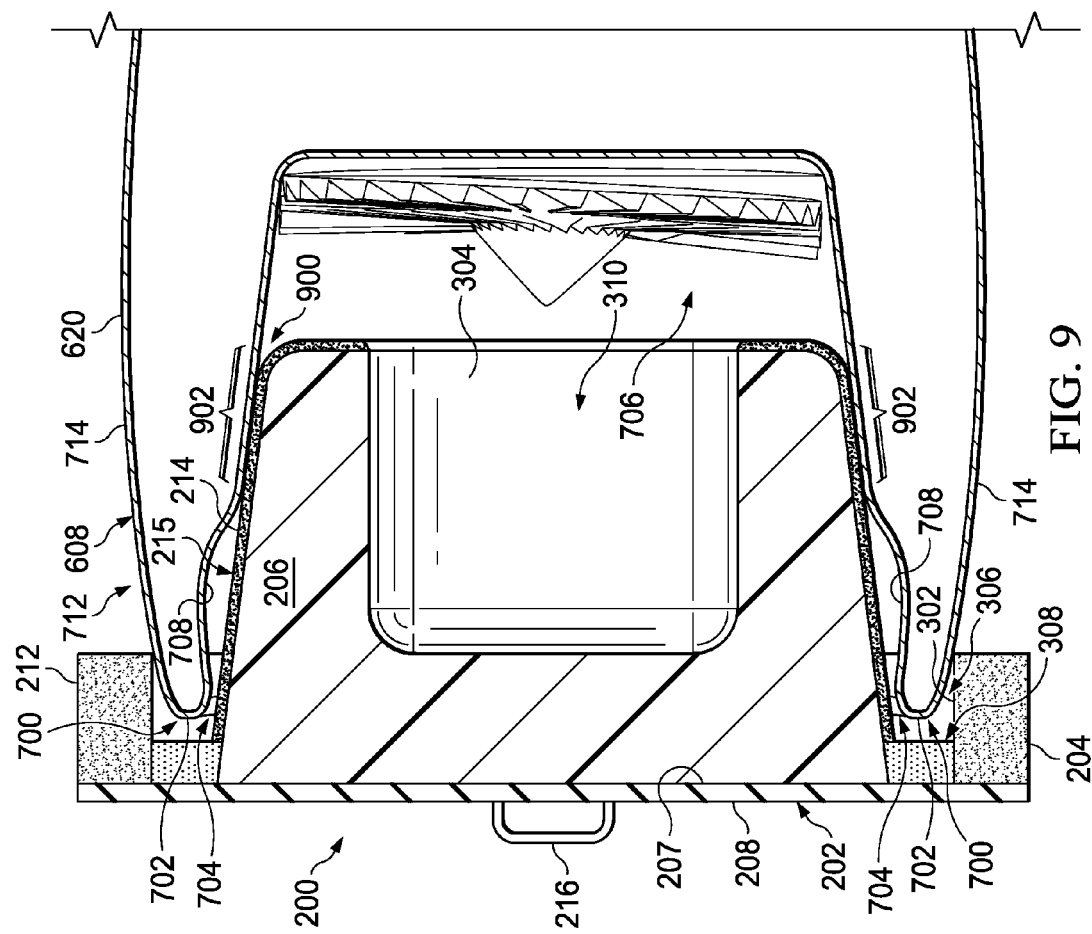
FIG. 9 is an illustration of a cross-sectional view of a cover attached to an engine in accordance with an illustrative embodiment.

With reference now to FIG. 9, an illustration of a cross-sectional view of cover 200 attached to engine 608 is depicted in accordance with an illustrative embodiment. As depicted, cover 200 has been attached to end 700 of housing 620 to form interference fit 900. Interference fit 900 is formed by portion 902 of interior surface 708 of housing 620 and outer layer of material 215 at outer surface 214 of retaining feature 206.

In this illustrative example, leading edge 702 at end 700 may not come into contact with base 308 of channel 306 when interference fit 900 is formed. Further, as depicted, exterior surface 714 of housing 620 may not come into contact with inner surface 302 of flange 204 when interference fit 900 is formed.

The illustrations of cover 200 in FIGS. 2-9 are not meant to imply physical or architectural limitations to the manner in which an illustrative embodiment may be implemented. Other components in addition to or in place of the ones illustrated may be used. Some components may be unnecessary.

For example, in some illustrative examples, a portion of inner surface 302 may come into contact with exterior surface 714 of housing 620 when interference fit 900 is formed. In other illustrative examples, leading edge 702 may come into contact with base 308 of channel 306 when interference fit 900 is formed.

Further, the different components shown in FIGS. 2-9 may be combined with components in FIG. 1, used with components in FIG. 1, or a combination of the two. Additionally, some of the components in FIGS. 2-9 may be illustrative examples of how components shown in block form in FIG. 1 can be implemented as physical structures. Of course, in other illustrative examples, the components shown in block from in FIG. 1 may be implemented using other physical structures than the physical structures shown in FIGS. 2-9.

The illustrative embodiments also recognize and take into account that in some cases, an aircraft may be stored or parked outside and exposed to the environment. For example, exposure to rain may result in undesired amounts of moisture being on the inlet or other parts of the engine of an aircraft. The illustrative embodiments also recognize and take into account that in other cases, an aircraft may be located in a structure that may not be climate controlled. As a result, the aircraft may be exposed to conditions that may cause moisture to form on the different parts of the aircraft, including the engine inlet or other parts of the engine where moisture is undesirable.

The moisture may cause inconsistencies to form or spread. For example, an inconsistency such as discoloration of the metal on the inlet may result. The discoloration may be aesthetically unappealing and expensive to remove.

Thus, the illustrative embodiments also provide a method and apparatus for covering an opening in an engine housing that reduces concerns about moisture. In one illustrative example, an apparatus comprises a structure, a flange, a retaining feature, and a sealing system. The structure is configured to cover an opening of a housing for an engine. The flange is comprised of a deformable material and configured to extend from the structure around a circumference of the structure. The retaining feature is configured to extend, substantially as a hollowed cylinder into an inlet of the engine through the opening of the housing from a middle portion of the structure, the hollowed cylinder being sealed at one end by the structure, such that the retaining feature and the flange form a channel configured to receive an end of the housing and form an interference fit with a portion of an interior surface of the housing. The sealing system is configured to reduce moisture entering the opening of the housing into the inlet of the engine.

Figure 10:
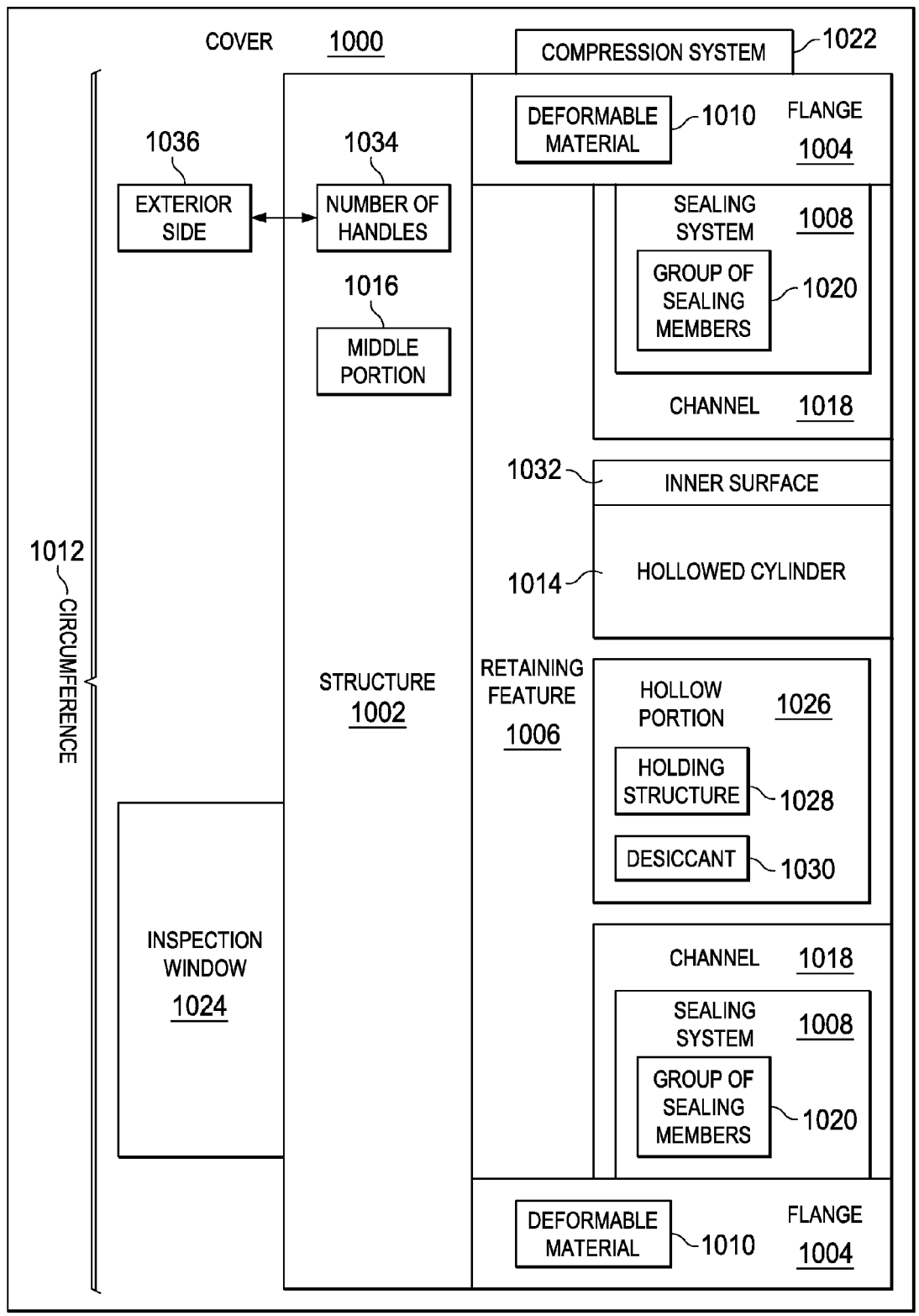
FIG. 10 is an illustration of a cover with additional moisture reduction features in the form of a block diagram in accordance with an illustrative embodiment.

With reference next to FIG. 10, an illustration of a cover with additional moisture reduction features in the form of a block diagram is depicted in accordance with an illustrative embodiment. In this illustrative example, cover 1000 also may be used as a cover for engine 102 in FIG. 1. As depicted, cover 1000 may include one or more features from cover 100 in FIG. 1 in addition to the ones illustrated in this figure. All the features from cover 100 that may be used in cover 1000 are not depicted with respect to cover 1000, to avoid obscuring additional features for this illustrative example.

In this example, cover 1000 includes a number of different components. As depicted, cover 1000 includes structure 1002, flange 1004, retaining feature 1006, and sealing system 1008.

Structure 1002 is configured to cover opening 118 of engine 102 in FIG. 1. In particular, structure 1002 has a shape selected to fully cover opening 118 of housing 108 for engine 102 in FIG. 1.

In this illustrative example, flange 1004 extends from structure 1002. Flange 1004 is comprised of deformable material 1010 and configured to extend from structure 1002 around circumference 1012 of structure 1002. In this illustrative example, deformable material 1010 is comprised of material selected from one of a foam material, a polyurethane material, an elastomer, a polymer, a shape memory polymer, a syntactic foam material, an integral skin foam material, an aerogel, or other suitable types of materials.

In this example, retaining feature 1006 is configured to extend substantially as hollowed cylinder 1014 into inlet 114 of engine 102 in FIG. 1 through the opening 118 of housing 108 in FIG. 1, from middle portion 1016 of structure 1002. In this example, hollowed cylinder 1014 is sealed at one end by structure 1002. Retaining feature 1006 and flange 1004 form channel 1018 configured to receive an end of housing 108 and form an interference fit with a portion of interior surface 110 of housing 108 in FIG. 1.

As depicted, sealing system 1008 is part of cover 1000. Sealing system 1008 is configured to reduce moisture entering opening 118 of housing 108 into inlet 114 of engine 102 in FIG. 1. In one illustrative example, sealing system 1008 is comprised of group of sealing members 1020. "A group of," as used herein with reference to an item means one or more items. For example group of sealing members 1020 is one or more sealing members.

Group of sealing members 1020 may be comprised of a number of different types of sealing members. For example, group of sealing members 1020 may include at least one of an o-ring, a bulb seal, an adhesive strip, a sealant, or some other suitable sealant.

Cover 1000 also may include compression system 1022. As depicted, compression system 1022 is configured to compress group of sealing members 1020 against housing 108 in FIG. 1. In other words, compression system 1022 applies a force against group of sealing members 1020. The force may be such that group of sealing members are compressed against housing 108 in FIG. 1.

Additionally, cover 1000 may include inspection window 1024. In these illustrative examples, inspection window 1024 allows an operator to see into cover 1000. In particular, inspection window 1024 provides a view of hollow portion 1026 of retaining feature 1006 in cover 1000. The view provided using inspection window 1024 may also be configured to allow for inspection of engine 102, such as inlet 114 in engine 102 in FIG. 1. As depicted, inspection window 1024 may be comprised of a substantially transparent material selected from one of glass, smart glass, a transparent ceramic, polycarbonate, a plastic, and other suitable materials.

In the illustrative example, cover 1000 also may include holding structure 1028 that is configured to hold desiccant 1030 within hollow portion 1026 of retaining feature 1006. In this illustrative example, desiccant 1030 is a material that absorbs moisture that may be present in the air. Desiccant 1030 may reduce humidity in the vicinity of the desiccant 1030. For example, desiccant 1030 may be a hygroscopic material that induces or sustains a state of dryness in its vicinity.

In this example, inner surface 1032 of retaining feature 1006 forms hollow portion 1026 in retaining feature 1006. As depicted, inspection window 1024 may be used to view desiccant 1030 within hollow portion 1026 of retaining feature 1006 when held in holding structure 1028.

Further, cover 1000 also may have number of handles 1034. As used herein, a "number" when used with reference to items means one or more items. For example number of handles 1034 is one or more handles. In this illustrative example, number of handles 1034 is attached to exterior side 1036 of structure 1028. Number of handles 1034 may be used to move cover 1000, install cover 1000 in engine 102, remove cover 1000 from engine 102, or perform other operations on cover 1000.

The illustration of cover 1000 in FIG. 10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, compression system 1022 may be unnecessary depending on the design and shape of different components in cover 1000. The installation of cover 1000 may provide a desired level of sealing from moisture by sealing system 1008 without requiring additional actions to engage sealing system 1008 with housing 108 for engine 102 in FIG. 1. In another illustrative example, number of handles 1034 may be omitted depending on the particular implementation. Further, in some illustrative examples, the different components in cover 1000 separate from each other for purposes of storage for transportation. For example, structure 1002 may be removably associated with flange 1004. In still other illustrative examples, structure 1002 may be comprised of multiple parts that may be connected to each other to install cover 1000.

Figure 11:
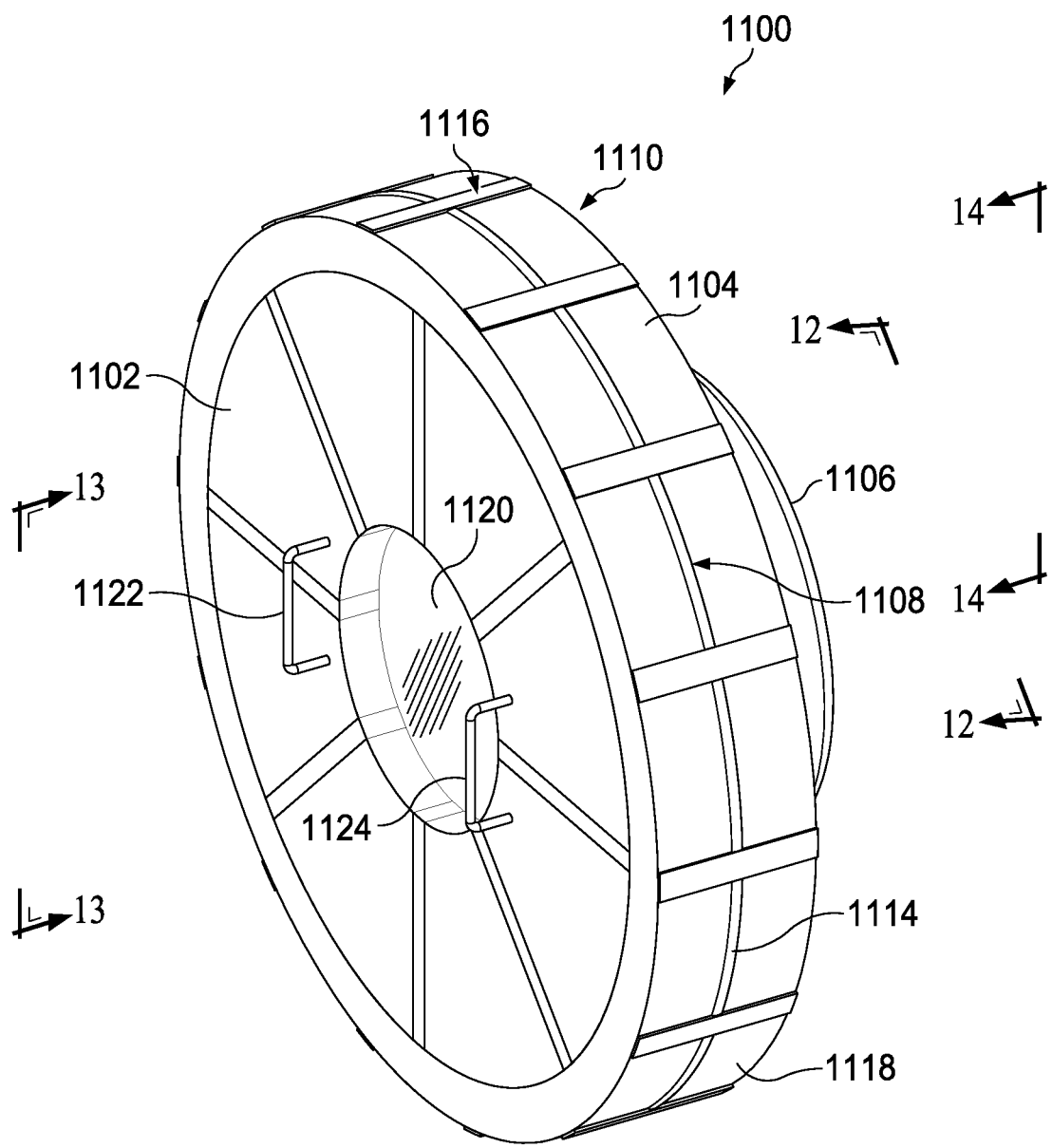
FIG. 11 is an illustration of a perspective view of a cover in accordance with an illustrative embodiment.

Turning to FIG. 11, an illustration of a perspective view of cover 1000 is depicted in accordance with an illustrative embodiment. In this example, cover 1100 comprises structure 1102, flange 1104, retaining feature 1106, and sealing system 1108. Structure 1102, flange 1104, retaining feature 1106, and sealing system 1108 are examples of physical implementations for structure 1002, flange 1004, retaining feature 1006, and sealing system 1008, respectively, shown in block form in FIG. 10.

In this depicted example, structure 1102 is configured to cover an opening of a housing for an engine. Flange 1104 is physically associated with structure 1102. Flange 1104 extends from structure 1102 around circumference 1110 of structure 1102.

When one component is "physically associated" with another component, the association is a physical association in the depicted examples. For example, a first component may be considered to be physically associated with a second component by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

Retaining feature 1106 is physically associated with structure 1102 and also extends from structure 1102. Retaining feature 1106 is designed to cause an interference fit with an interior portion of an engine when cover 1100 is installed.

As depicted, retaining feature 1106 has a shape of a cylinder. In particular, the shape may be a hollowed cylinder that may taper. Retaining feature 1106 extends into an inlet of an engine through an opening of the housing of an engine when cover 1100 is installed on the engine.

In the illustrative examples, sealing system 1108 is configured to reduce moisture that may occur on a portion of the engine, such as an inlet. As depicted, strap 1114 is part of sealing system 1108. Strap 1114 is used to compress or push a sealing member (not shown) against the housing of the engine. The compression provides increased sealing against moisture in this depicted example. In this manner, strap 1114 may be used to cause sealing system 1108 to have a desired amount of engagement with exterior surface 112 of housing 108 for engine 102 in FIG. 1 to seal against moisture.

In this illustrative example, retainers 1116 hold strap 1114 on cover 1100. In the illustrative example, retainers 1116 take the form of loops, bands, or some other form that holds strap 1114. In this particular example, strap 1114 in retainers 1116 are examples of a physical implementation for compression system 1022 shown in block form in FIG. 10. In this illustrative example, buckle 1118 is integrated with strap 1114. Buckle 1118 may be used to cinch and retain strap 1114. In this manner, buckle 1118 may aid in compressing a sealing member against the housing of the engine.

As depicted in this illustrative example, window 1120 is located in structure 1102. Window 1120 is positioned centrally in structure 1102 in this illustrative example. As depicted, window 1120 allows for viewing of the interior of cover 1100.

Further, cover 1100 also includes handle 1122 and handle 1124. These handles may be used to position, install, remove, or perform other operations with respect to cover 1100.

Figure 12:
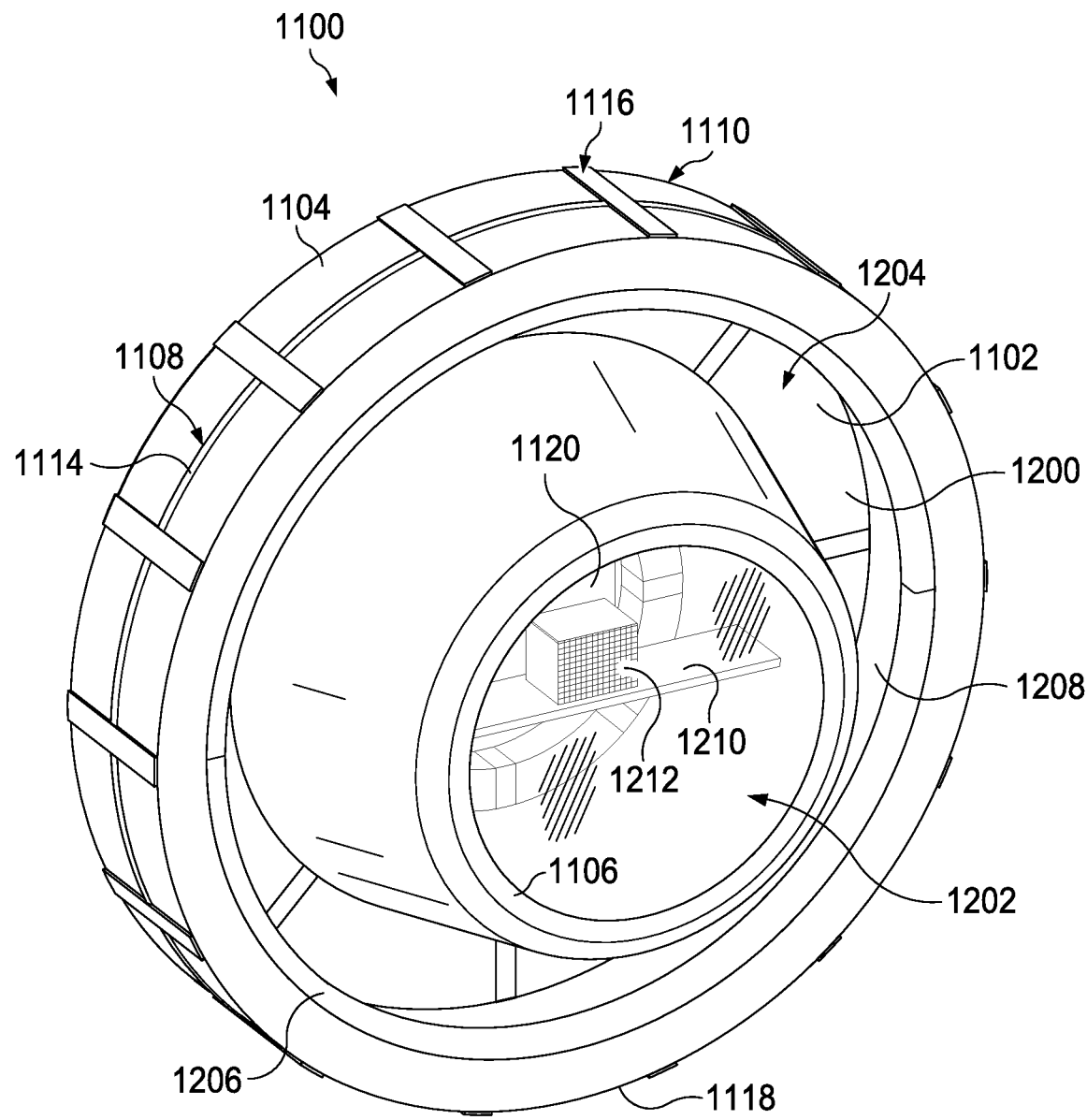
FIG. 12 is an illustration of another perspective view of a cover in accordance with an illustrative embodiment.

With reference next to FIG. 12, an illustration of another perspective view of cover 1100 is depicted in accordance with an illustrative embodiment. In this view, a perspective view of cover 1100 is shown in the direction of lines 12-12 in FIG. 12.

In this view, flange 1104 and retaining feature 1106 extend from interior side 1200 of structure 1102. Interior side 1200 is the side that faces the engine when cover 1100 is installed.

Hollow portion 1202 in retaining feature 1106 is seen in this view of cover 1100. Also seen in this view, retaining feature 1106 and flange 1104 form channel 1204. As depicted, channel 1204 is configured to receive an end of the housing and form an interference fit with a portion of an interior surface of the housing. For example, channel 1204 may receive an inlet of engine.

Also seen in this view is sealing member 1206. In this particular example, sealing member 1206 takes the form of a bulb seal. As can be seen, sealing member 1206 is associated with inner surface 1208 of flange 1104. Sealing member 1206 reduces an amount of moisture that may enter an engine through the opening in the housing of the engine at the front part of the housing covered by cover 1100.

In this illustrative example, holding structure 1210 is located within hollow portion 1202. In this example, holding structure 1210 takes the form of a shelf on which desiccant 1212 may be placed. In this illustrative example, desiccant 1212 may be inspected through window 1120 to determine whether desiccant 1212 needs to be replaced.

Figure 13:
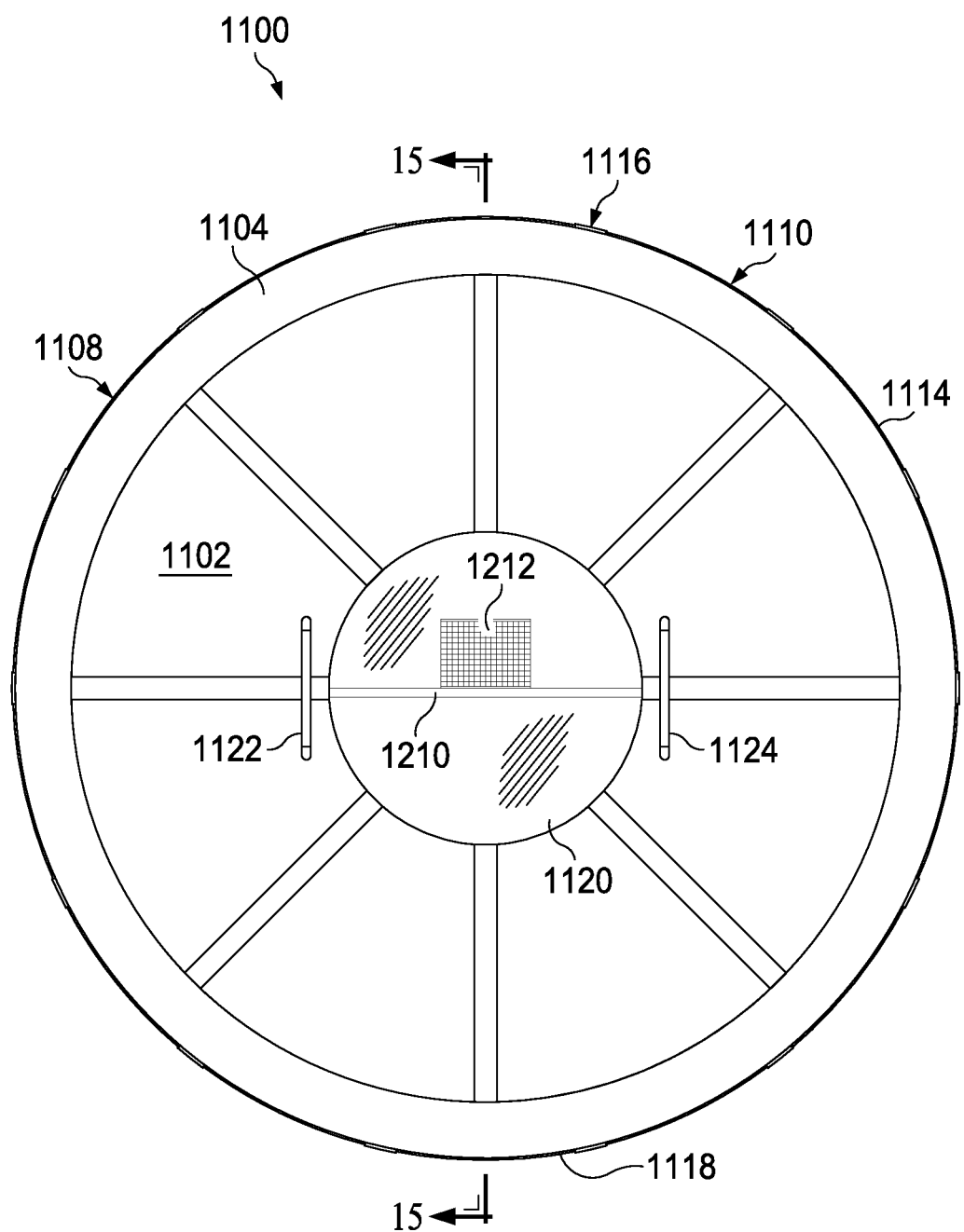
FIG. 13 is an illustration of a front view of a cover in accordance with an illustrative embodiment.

In FIG. 13, an illustration of a front view of cover 1100 is depicted in accordance with an illustrative embodiment. A view of cover 1100 is shown in the direction of lines 13-13 in FIG. 11.

Figure 14:
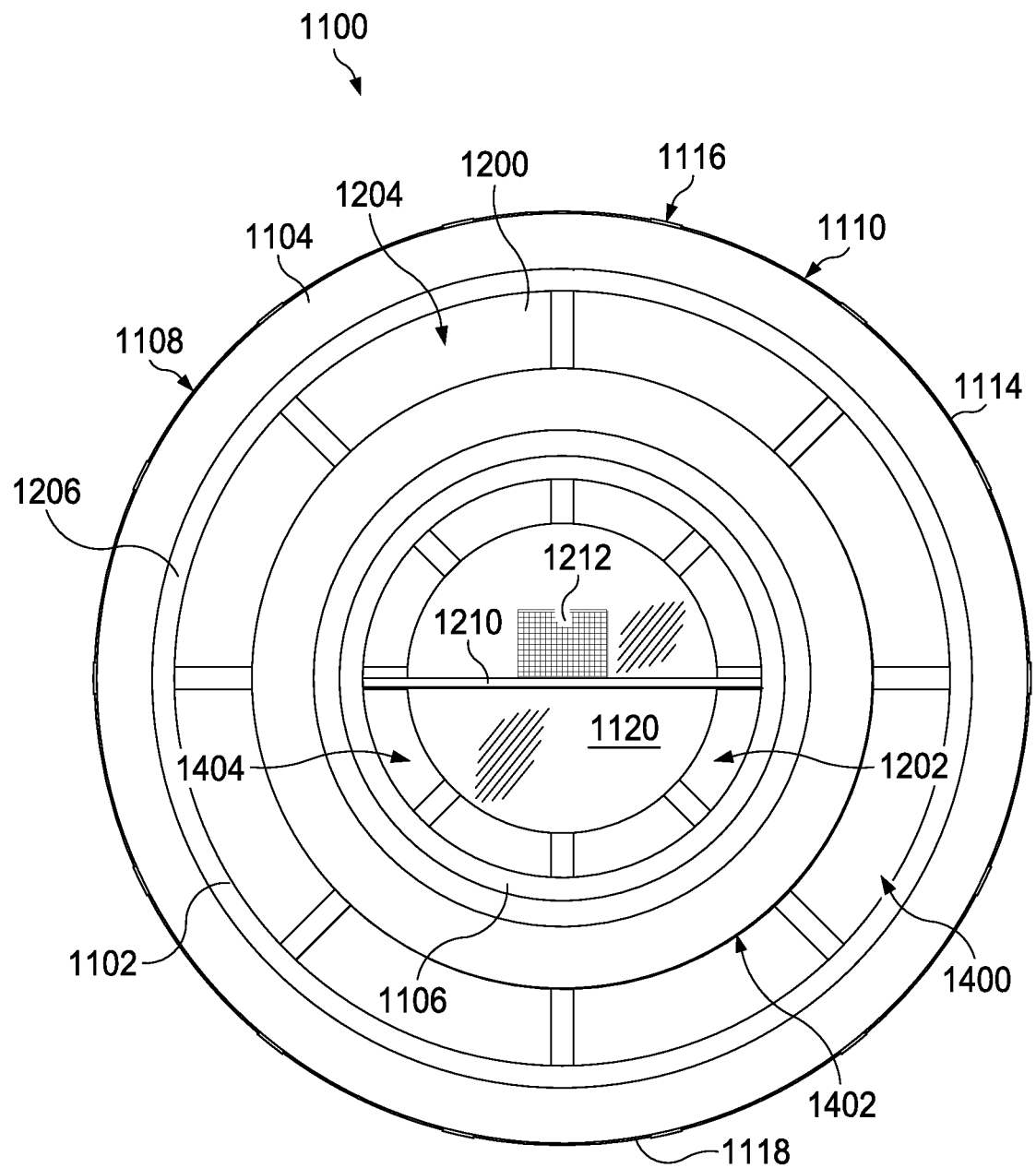
FIG. 14 an illustration of a rear view of a cover in accordance with an illustrative embodiment.

With reference to FIG. 14, an illustration of a rear view of cover 1100 is depicted in accordance with an illustrative embodiment. A view of cover 1100 is shown in the direction of lines 14-14 in FIG. 11.

In this view, different portions of structure 1102 are seen. The portions include an outer portion, a middle portion, and an inner portion.

In this view, flange 1104 extends from outer portion 1400 of structure 1102. Retaining feature 1106 extends from middle portion 1402 of structure 1102. Hollow portion 1202 extends to inner portion 1404 of structure 1102.

Figure 15:
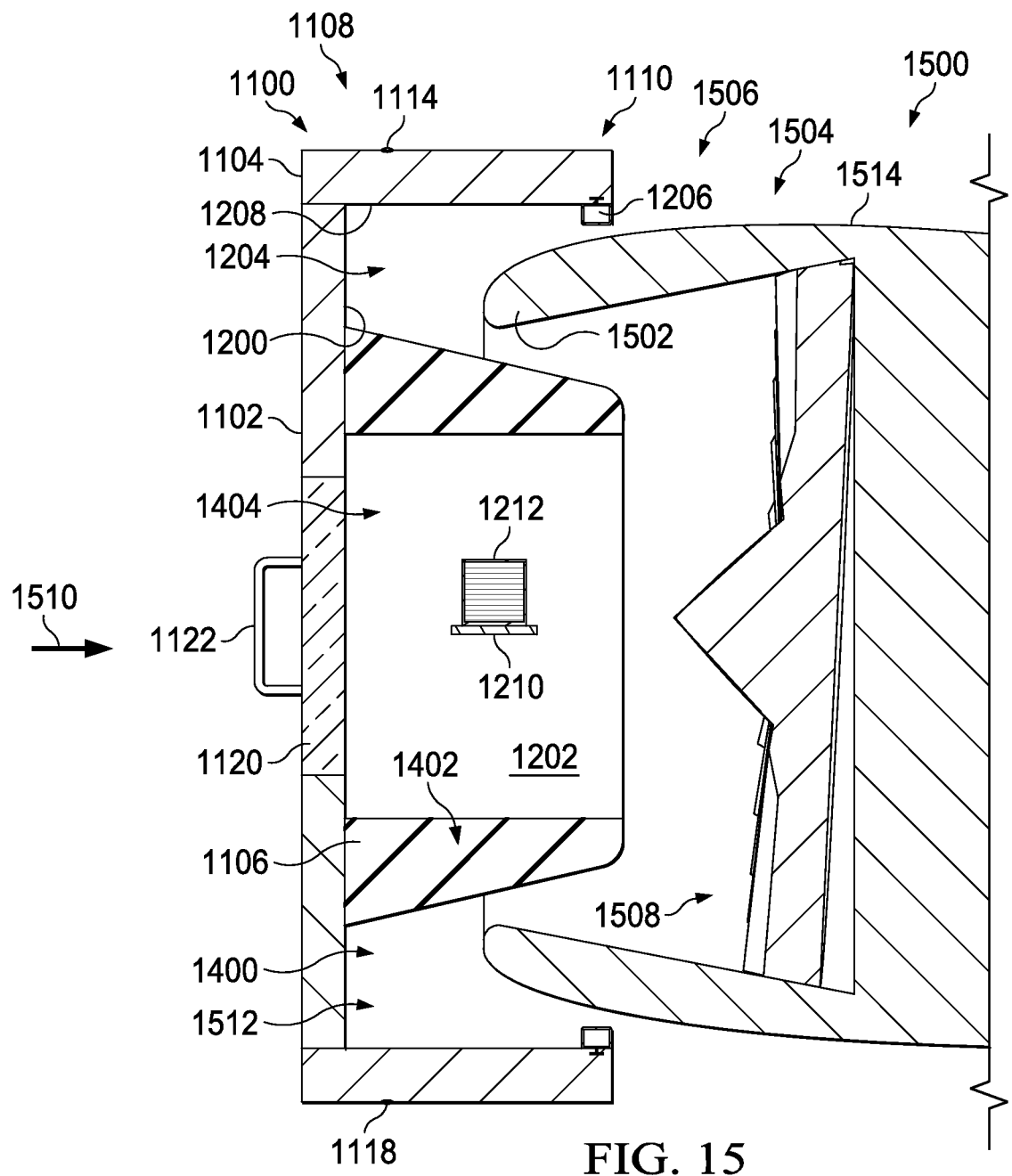
FIG. 15 is an illustration of a cross-sectional view of a cover on an engine in accordance with an illustrative embodiment.

In FIG. 15, an illustration of a cross-sectional view of cover 1100 on engine 1500 is depicted in accordance with an illustrative embodiment. In this illustration, a cross sectional view of cover 1100 taken along lines 15-15 in FIG. 13 is shown.

In this example, cover 1100 is shown on engine 1500. As can be seen in this view, flange 1104 extends past inlet 1502 on housing 1504 of engine 1500. Sealing member 1206 is configured to reduce moisture that may enter from exterior 1506 and reach interior 1508 of engine 1500.

Also, flange 1104 extends past inlet 1502 in this particular example. Extension of flange 1104 in conjunction with the location of sealing member 1206 past inlet 1502 in aft direction 1510 reduces moisture that may reach inlet 1502 located in sealed volume 1512. In the illustrative example, sealed volume 1512 is a volume defined by cover 1100 and housing 1504 that is sealed against moisture. This seal may reduce or prevent moisture from entering sealed volume 1512.

As depicted, sealing member 1206 engages exterior surface 1514 of housing 1504 of engine 1500. In other words, sealing member 1206 touches exterior surface 1514. This type of engagement may or may not provide a desired level of sealing to reduce moisture from reaching inlet 1502. In other words, in some cases the engagement of sealing member 1206 may be sufficient when cover 1100 is installed in engine 1500. In other illustrative examples, the level of engagement may not be as great as desired.

Figure 16:
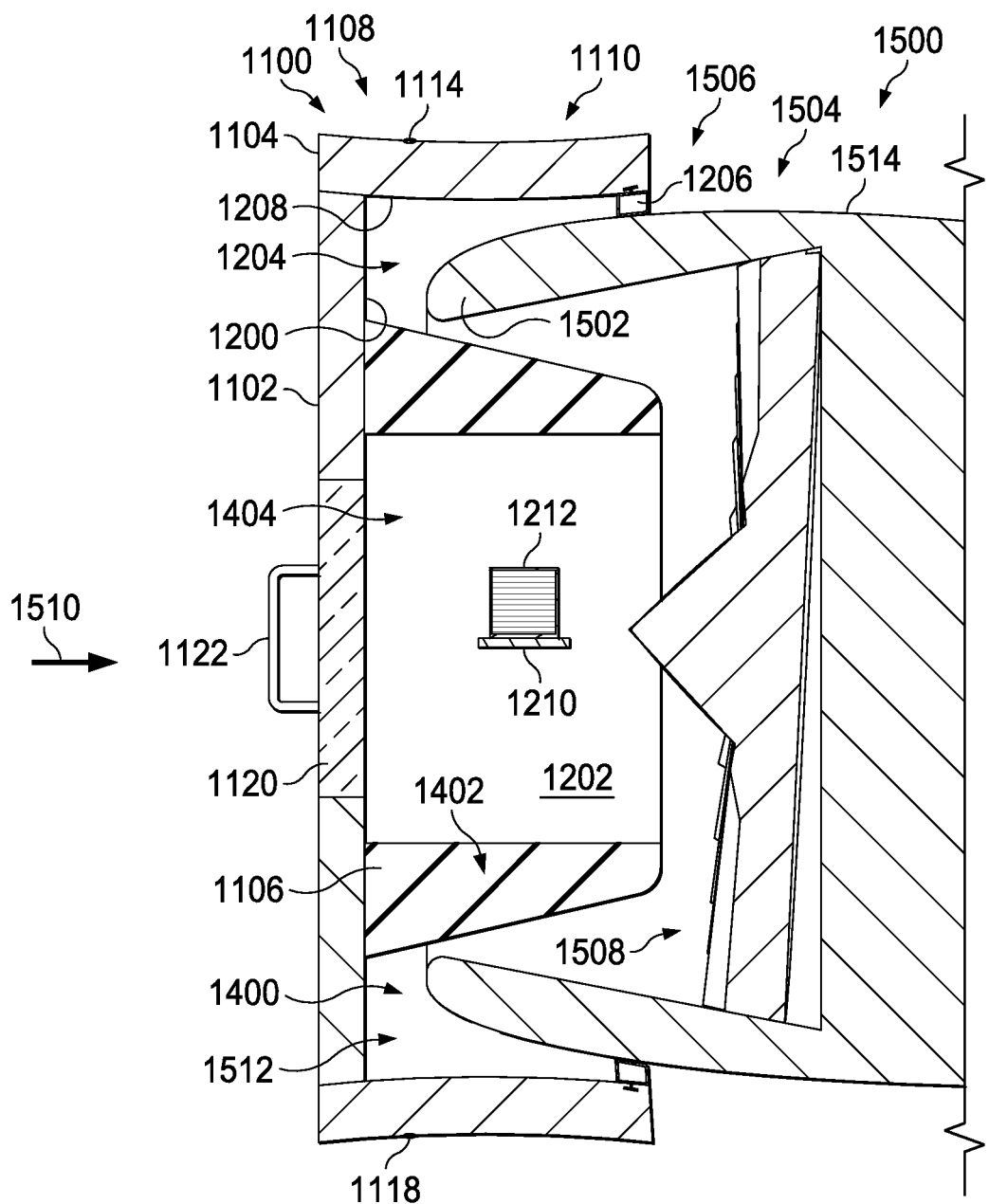
FIG. 16 is an illustration of a cross-sectional view of a cover with a compressed seal on an engine in accordance with an illustrative embodiment.

Turning next to FIG. 16, an illustration of a cross-sectional view of cover 1100 with a compressed seal on engine 1500 is depicted in accordance with an illustrative embodiment. In this example, strap 1114 has been manipulated to cause sealing member 1206 to be compressed against exterior surface 1514 of housing 1504 on engine 1500. In particular, strap 1114 may cause deformation of flange 1104, which, in turn, causes deformation of sealing member 1206 in the form of compressing sealing member 1206. This compression increases the engagement of sealing member 1206 against exterior surface 1514 of housing 1504 and may provide a desired level of sealing against the entry of moisture to inlet 1502 and into interior 1508 of housing 1504.

As can be seen in this illustrative example, the inner surface of flange 1104 and exterior surface 1514 of retaining feature 1106 form channel 1204 without contacting inlet 1502 of engine 1500. Sealing member 1206 also did not contact inlet 1502 in this illustrative example.

The different components shown in FIGS. 11-16 may be combined with components in FIG. 10, used with components in FIG. 10, or a combination of the two. Additionally, some of the components in FIGS. 11-16 may be illustrative examples of how components shown in block form in FIG. 10 can be implemented as physical structures. For example, although compression system 1022 in block form in FIG. 10 is shown as being physically implemented using strap 1114, compression system 1022 may be implemented in other ways. For example, compression system 1022 may be implemented using a metal clamp. This metal clamp may be removably connected to structure 1102, flange 1104, or other components in cover 1100.

With reference now to FIG. 17, an illustration of a process for covering an end of a housing for an engine in the form of a flowchart is depicted in accordance with an illustrative embodiment. The process depicted in FIG. 10 may be used to attach a cover, such as cover 100 in FIG. 1 or cover 1000 in FIG. 10, to the end of a housing for an engine, such as end 116 of housing 108 for engine 102 in FIG. 1.

The process begins by positioning the cover relative to the end of the housing for the engine such that an interior side of a structure for the cover faces the end of the housing (operation 1700). The cover may comprise the structure as well as a flange and a retaining feature. In operation 1700, the cover may be positioned such that the flange and the retaining feature extend from the interior side of the structure in a direction towards the end of the housing for the engine.

Thereafter, the cover is moved in a direction towards the end of the housing for the engine such that the retaining feature extends into an inlet of the engine through the opening of the housing (operation 1702). The cover is then pushed in the direction towards the end of the housing such that an outer surface of the retaining feature pushes against an interior surface of the housing for the engine to form an interference fit with a portion of the interior surface of the housing (operation 1704).

In operation 1704, the retaining feature is moved into the inlet until an interference fit is formed with a desired level of stiction. The cover is considered attached to the end of the housing when the interference fit has been formed with the desired level of stiction.

The process then engages the sealing system (operation 1706), with the process terminating thereafter. This engagement may be formed by compressing the sealing system against the housing with a compression system configured to compress the group of sealing members. This engagement forms a sealed volume defined by the cover and the housing of the engine. This sealed volume is one that is sealed in a manner that reduces the entry of moisture and is not necessarily airtight. In other words, the sealed volume may be resistant to the entry of moisture into the sealed volume that is caused by rain or other environmental conditions that the engine may be exposed to during storage.

Turning next to FIG. 18, an illustration of a process for producing moisture is depicted in accordance with an illustrative embodiment. The process illustrated in FIG. 18 may be implemented using cover 1000 in FIG. 10.

The process begins by placing a desiccant on a holding structure within a hollow portion of the retaining feature (operation 1800). In these illustrative examples, the desiccant may be placed in a holding structure prior to installation of the cover. In other illustrative examples, the inspection window may be opened to place the desiccant on the holding structure.

This desiccant may be used to remove or reduce moisture that may enter or be present in the sealed volume. For example, if the sealed volume is not airtight, humidity may introduce moisture.

Thereafter, the process inspects a status of the desiccant through an inspection window located in the structure (operation 1802). A determination is made as to whether the desiccant should be replaced (operation 1804). This determination may be made by identifying a color of the desiccant. The desiccant may be configured to change to a particular color when the desiccant has been saturated with moisture and needs replacement.

If the desiccant should be replaced, the desiccant is removed and a new desiccant is placed into the holding structure (operation 1808). The process waits for a period of time and then returns to operation 1802. The period of time may be periodically or non-periodic depending on the particular implementation. The process also proceeds to operation 1802 if the desiccant does not need to be replaced.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1706 is not a separate operation from installation of the cover in the prior operations. For example, the engagements of the sealing system may occur at the same time the cover is installed if installment of the cover causes engagement in the sealing system.

Figure 19:
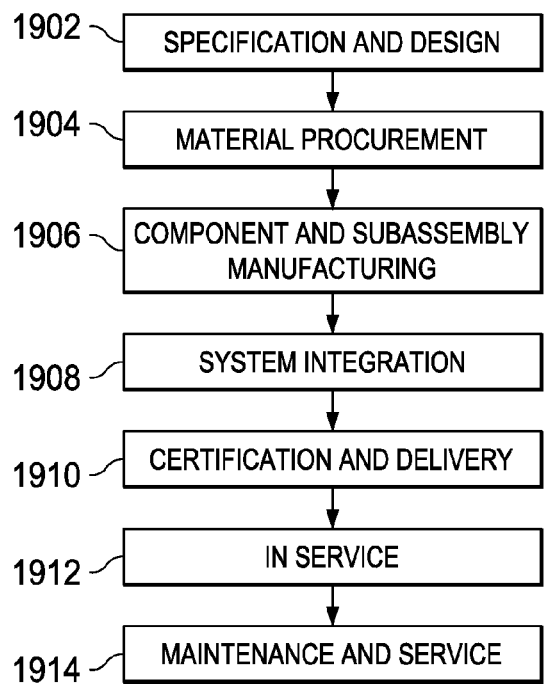
FIG. 19 is an illustration of an aircraft manufacturing and service method in the form of a block diagram in accordance with an illustrative embodiment.
Figure 20:
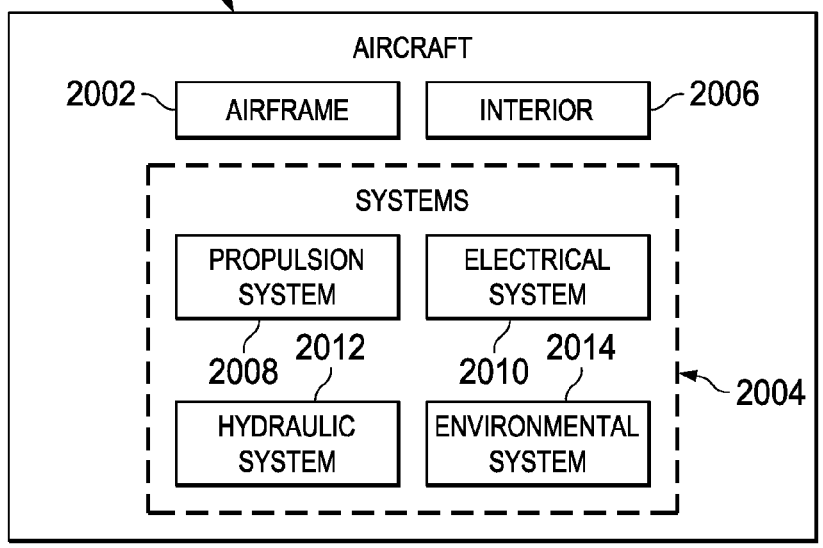
FIG. 20 is an illustration of an aircraft in the form of a block diagram in which an illustrative embodiment may be implemented.

Illustrative embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in the form of a block diagram in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 takes place. Thereafter, aircraft 2000 may go through certification and delivery 1910 in order to be placed in service 1912. While in service 1912 by a customer, aircraft 2000 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft is depicted in the form of a block diagram in which an illustrative embodiment may be implemented. In this example, aircraft 2000 is produced by aircraft manufacturing and service method 1900 in FIG. 19. Aircraft 2000 may be an example of one manner in which aircraft 106 in FIG. 1 may be implemented.

Aircraft 2000 may include airframe 2002 with plurality of systems 2004 and interior 2006. Examples of systems 2004 include one or more of propulsion system 2008, electrical system 2010, hydraulic system 2012, and environmental system 2014.

Any number of other systems may be included. Although an aerospace example is shown, different illustrative embodiments may be applied to other industries, such as the automotive industry, the marine industry, the energy industry, the construction industry, or some other suitable type of industry.

Apparatuses and methods embodied herein may be employed during at least one of the stages of aircraft manufacturing and service method 1900 in FIG. 19. For example, without limitation, cover 100 in FIG. 1 may be used to cover a jet engine for aircraft 2000 during at least one of component and subassembly manufacturing 1906, system integration 1908, and maintenance and service 1914.

In one illustrative example, components or subassemblies produced in component and subassembly manufacturing 1906 in FIG. 19 may be fabricated or manufactured in a manner similar to components or subassemblies produced while aircraft 2000 is in service 1912 in FIG. 19. As yet another example, one or more apparatus embodiments, method embodiments, or a combination thereof may be utilized during production stages, such as component and subassembly manufacturing 1906 and system integration 1908 in FIG. 19.

One or more apparatus embodiments, method embodiments, or a combination thereof may be utilized while aircraft 2000 is in service 1912 and/or during maintenance and service 1914 in FIG. 19. Use of the different illustrative embodiments may protect an inlet for an engine in aircraft 2000 from, for example, without limitation, debris, foreign objects, weather conditions, birds nesting within the inlet, and/or other types of situations. Further, the different illustrative embodiments provide a cover that can cover and protect the leading edge of the housing for the engine in aircraft 2000.

Thus, the different illustrative embodiments provide a method and apparatus for protecting an inlet of an aircraft engine and a leading edge of a cowl structure for the aircraft engine. In one illustrative embodiment, an apparatus comprises a structure, a flange, and a retaining feature. The structure is configured to cover an opening of a housing for an engine. The flange is comprised of a deformable material and is configured to extend from the structure around a circumference of the structure. The retaining feature is configured to extend from a middle portion of the structure such that the retaining feature and the flange form a channel configured to receive an end of the housing. The retaining feature is configured to extend into an inlet of the engine through the opening of the housing to form an interference fit with a portion of an interior surface of the housing.

In this manner, the use of a cover with a sealing system and other components may provide protection against moisture and reduce the effects of moisture on an engine. For example, the reduction of moisture may reduce discoloration that may be caused by moisture contacting an inlet of the engine over a period of time. As a result, the operations to remove the discoloration for aesthetics may be reduced or avoided. Also, the use of a desiccant may also reduce moisture that may cause undesired inconsistencies in an engine.

Further, the installation of the cover may reduce the need for the use of tape and plastic currently used to cover and seal engine housings from moisture. As a result, the use of one or more features in the different illustrative examples may reduce the maintenance cost for an aircraft.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a structure configured to cover an opening of a housing for an engine;

a flange comprised of a deformable material and extending from the structure around a circumference of the structure;

a retaining feature configured to extend as a hollowed cylinder into an inlet of the engine through the opening of the housing from a middle portion of the structure, the hollowed cylinder being sealed at one end by the structure, such that the retaining feature and the flange form a channel configured to receive an end of the housing and form an interference fit with a portion of an interior surface of the housing;

a sealing system configured to reduce moisture entering the opening of the housing into the inlet of the engine; and wherein the sealing system comprises a group of sealing members.

2. The apparatus of claim 1, wherein the group of sealing members includes at least one of an o-ring, a bulb seal, an adhesive strip, or a sealant.

3. The apparatus of claim 1 further comprising:
a compression system configured to compress the group of sealing members against the housing.

4. The apparatus of claim 1 further comprising:
a holding structure configured to hold a desiccant within a hollow portion of the retaining feature, wherein an inner surface of the retaining feature forms the hollow portion in the retaining feature.

5. The apparatus of claim 1 further comprising:
an inspection window located in the structure, wherein the inspection window provides a view of a hollow portion of the retaining feature.

6. The apparatus of claim 1, wherein an inner surface of the flange and an outer surface of the retaining feature form the channel without contacting the inlet of the engine.

7. The apparatus of claim 1, wherein the structure has a shape selected to fully cover the opening of the housing for the engine.

8. The apparatus of claim 1 further comprising:
a number of handles attached to an exterior side of the structure.

9. The apparatus of claim 1, wherein the deformable material is selected from one of a foam material, a polyurethane material, an elastomer, a polymer, a shape memory polymer, a syntactic foam material, an integral skin foam material, and an aerogel.

10. A method for covering an end of a housing for an engine, the method comprising:

positioning a cover relative to the end of the housing for the engine, wherein the cover comprises a structure, a flange comprised of a deformable material extending from the structure around a circumference of the structure, and a retaining feature configured to extend from a middle portion of the structure such that the retaining feature and the flange form a channel configured to receive the end of the housing;

moving the cover in a direction towards the end of the housing for the engine such that the retaining feature extends into an inlet of the engine through an opening of the housing to form an interference fit between the retaining feature and a portion of an interior surface of the housing; and compressing a sealing system against the housing with a compression system configured to compress a group of sealing members.

11. The method of claim 10 further comprising:
placing a desiccant on a holding structure within a hollow portion of the retaining feature, wherein an inner surface of the retaining feature forms the hollow portion in the retaining feature.

12. The method of claim 11 further comprising:
inspecting a status of the desiccant through an inspection window located in the structure, wherein the inspection window provides a view of the desiccant on the holding structure.

13. The method of claim 10, wherein an inner surface of the flange and an outer surface of the retaining feature form the channel without contacting the inlet of the engine.

14. The method of claim 10, wherein the structure has a shape selected to fully cover the opening of the housing for the engine.

15. The method of claim 10, wherein a number of handles is attached to an exterior side of the structure.

16. The method of claim 10, wherein the deformable material is selected from at least one of a foam material, a polyurethane material, an elastomer, a polymer, a shape memory polymer, a syntactic foam material, an integral skin foam material, or an aerogel.

17. The method of claim 10, wherein the sealing system comprises:
the group of sealing members.

18. The method of claim 17, wherein the group of sealing members includes at least one of an o-ring, a bulb seal, an adhesive strip, or a sealant.

* * * * *